(12) United States Patent
Bian

(10) Patent No.: US 12,244,386 B2
(45) Date of Patent: Mar. 4, 2025

(54) METHOD AND APPARATUS FOR ACQUIRING PRECODING MATRIX INDEX AND STORAGE MEDIUM

(71) Applicant: ZTE CORPORATION, Guangdong (CN)

(72) Inventor: Qing Bian, Guangdong (CN)

(73) Assignee: SANECHIPS TECHNOLOGY CO., LTD., Guangdong (CN)

( * ) Notice: Subject to any disclaimer, the term of this patent is extended or adjusted under 35 U.S.C. 154(b) by 468 days.

(21) Appl. No.: 17/622,741

(22) PCT Filed: Sep. 21, 2020

(86) PCT No.: PCT/CN2020/116368
§ 371 (c)(1),
(2) Date: Dec. 24, 2021

(87) PCT Pub. No.: WO2021/057634
PCT Pub. Date: Apr. 1, 2021

(65) Prior Publication Data
US 2022/0166483 A1    May 26, 2022

(30) Foreign Application Priority Data
Sep. 23, 2019 (CN) .......... 201910897558.7

(51) Int. Cl.
*H04B 7/06* (2006.01)
*H04B 7/0417* (2017.01)
*H04B 7/0456* (2017.01)

(52) U.S. Cl.
CPC ......... *H04B 7/0639* (2013.01); *H04B 7/0417* (2013.01); *H04B 7/0456* (2013.01)

(58) Field of Classification Search
CPC ... H04B 7/0639; H04B 7/0417; H04B 7/0456
See application file for complete search history.

(56) References Cited

U.S. PATENT DOCUMENTS

| 10,404,339 B1 | 9/2019 | Nammi et al. |
| 2012/0002710 A1* | 1/2012 | Park .......................... H04L 1/20 375/227 |

(Continued)

FOREIGN PATENT DOCUMENTS

| CN | 103378896 A | 10/2013 |
| CN | 104321983 A | 1/2015 |

(Continued)

OTHER PUBLICATIONS

Japan Patent Office, first Office action dated Mar. 7, 2023, for corresponding JP application No. 2021-577199.

(Continued)

*Primary Examiner* — Faruk Hamza
*Assistant Examiner* — Alan L Lindenbaum
(74) *Attorney, Agent, or Firm* — Li & Cai Intellectual Property (USA) Office

(57) ABSTRACT

Disclosed area method and apparatus for acquiring a PMI, and a storage medium. The method includes: searching a first group of PMI parameters according to first initial values of a PMI parameter set, and determining the first group of PMI parameters corresponding to the maximum capacity as a first group of reported values; generating second initial values of the PMI parameter set; searching a second group of PMI parameters according to the second initial values of the PMI parameter set, and determining the second group of PMI parameters corresponding to the maximum capacity as a second group of reported values; generating third initial values of the PMI parameter set; and searching a third group of PMI parameters according to the third initial values of the PMI parameter set, and determining the third group of PMI parameters corresponding to the maximum capacity as a third group of reported values.

15 Claims, 4 Drawing Sheets

(56) References Cited

U.S. PATENT DOCUMENTS

| | | | |
|---|---|---|---|
| 2012/0170636 A1 | 7/2012 | Wang et al. | |
| 2019/0215086 A1 | 7/2019 | Kwak et al. | |
| 2019/0334595 A1* | 10/2019 | Ji | H04B 7/0695 |
| 2020/0052749 A1* | 2/2020 | Nammi | H04B 7/0626 |

FOREIGN PATENT DOCUMENTS

| | | |
|---|---|---|
| CN | 108282204 A | 7/2018 |
| CN | 109391306 A | 2/2019 |
| CN | 109428635 A | 3/2019 |
| EP | 3506522 A1 | 7/2019 |
| WO | WO2018127142 A1 | 7/2018 |
| WO | WO20180127142 A1 | 7/2018 |
| WO | WO20180127426 A1 | 7/2018 |
| WO | WO2018199625 A1 | 11/2018 |

OTHER PUBLICATIONS

"3rd Generation Partnership Project; Technical Specification Group Radio Access Network; NR; Physical Layer procedures for data", 3GPP TS 38.214 V16.6.0(Jun. 2021), pp. 74-96.
Japan Patent Office, Second Office Action dated Sep. 26, 2023, for corresponding JP application No. 2021-577199.
"3rd Generation Partnership Project; Technical Specification Group Radio Access Network; NR; Physical Layer procedures for data (Release 15)", 3GPP TS 38.214 V15.6.0(Jun. 2019), pp. 54-67.
Korean Patent Office, first Office action dated Nov. 10, 2023, for corresponding KR application No. 10-2021-7042503.
European Patent Office, Extended European Search Report dated Feb. 14, 2023, for corresponding EP application No. 20867670.0.
WIPO, International Search Report issued on Nov. 18, 2020.

* cited by examiner

METHOD AND APPARATUS FOR ACQUIRING PRECODING MATRIX INDEX AND STORAGE MEDIUM

CROSS-REFERENCE TO RELATED APPLICATION

This is a National Phase Application filed under 35 U.S.C. 371 as a national stage of PCT/CN2020/116368, filed on Sep. 21, 2020, an application claiming priority from the Chinese patent application No. 201910897558.7 filed with the China Patent Office on Sep. 23, 2019, the entire contents of which are incorporated in the present application by reference.

TECHNICAL FIELD

The present application relates to, but is not limited to, next generation communication technologies, and for example, relates to a method and apparatus for acquiring a precoding matrix index and a storage medium.

BACKGROUND

The $5^{th}$ Generation mobile communication technology (5G) system employs the massive antenna array and beamforming technology to improve system performance.

The massive antenna array based beamforming technology requires that a transmitting end accurately acquires Channel State Information (CSI), and select an optimal beam for data transmission according to the acquired CSI.

The CSI is obtained by feeding back to the transmitting end through a User Equipment (UE) at a receiving end, where the feedback information includes: a CSI Reference Signal (CSI-RS), a CSI-RS Resource Indicator (CRI), a Rank Indicator (RI) of a channel matrix, a Precoding Matrix Index (PMI), a Channel Quality Indicator (CQI), and an optimal Layer Indicator (LI). The UE at the receiving end obtains a channel coefficient matrix H and an interference noise matrix No through channel estimation, firstly selects a CSI-RS resource which is most suitable to be used in current reporting, i.e., to obtain CRI, then selects RI and PMI which are most matched with a current channel according to a certain optimal criterion, calculates CQI and LI after the RI and PMI are used, and finally reports the CSI to a base station. In a conventional PMI selection method, all PMIs in the current RI are traversed to select an optimal PMI according to a certain optimal criterion (such as maximum channel capacity or minimum mean square error). Therefore, the number of codebooks in the current layer determines complexity of the calculation.

The codebook design concept of the next generation communication system, such as the 5G system, is based on two-dimensional Discrete Fourier Transform (DFT) beams, added by appropriate spatial sampling, which notably increases the number of codebooks configured in the system. In a scenario of the MP antenna array in the 5G system configuration, a codebooks therein adopts a basic structure of first PMI+second PMI, where first PMI represents a wideband precoding indication, and second PMI represents a subband precoding indication. MP, namely multi-panel, refers to a plurality of antenna blocks with a relatively long distance from each other forming beams independently. For the configuration with a codebook mode of 1, first PMI is subdivided into first PMI1 to first PMI4, which respectively indicates phase between broadband beams and broadband panels. In this configuration, the MP 5G system may be configured with at most 32 CSI-RS ports, support configuration of at most 4 panels, and support a maximum spatial sampling multiple of 4 in the horizontal and vertical directions, in which case, the number of codebooks in each layer may reach 32768 at most. It is expected that the future 5G system may need to support more CSI-RS ports and precoding codebooks with higher resolution. Therefore, the number of codebooks in the future 5G system will still increase. It can be seen that if the traversal search algorithm is still adopted for each layer, then calculation of the UE feedback will involve tremendous complexity.

SUMMARY

The present application provides a method and apparatus for acquiring a PMI and a storage medium, which can realize selection of the PMI in a simple and effective manner.

There is provided a method for acquiring a precoding matrix index (PMI), including: searching a first group of PMI parameters according to first initial values of a PMI parameter set, and determining the first group of PMI parameters corresponding to the maximum capacity as a first group of reported values; generating second initial values of the PMI parameter set according to the first group of reported values and the first initial values of the PMI parameter set; searching a second group of PMI parameters according to the second initial values of the PMI parameter set, and determining the second group of PMI parameters corresponding to the maximum capacity as a second group of reported values; generating third initial values of the PMI parameter set according to the second group of reported values and the second initial values of the PMI parameter set; and searching a third group of PMI parameters according to the third initial values of the PMI parameter set, and determining the third group of PMI parameters corresponding to the maximum capacity as a third group of reported values.

There is further provided a computer-readable storage medium having computer-executable instructions stored thereon, wherein the computer-executable instructions are configured to cause the method for acquiring a PMI described in this disclosure to be implemented.

There is further provided an apparatus for acquiring a PMI, including a processor and a memory, wherein the memory has stored thereon a computer program operable on the processor to: cause steps of the method for acquiring a PMI described in this disclosure to be implemented.

There is further provided an apparatus for acquiring a PMI, including: a processing unit, a first search control unit, a second search control unit and a third search control unit, wherein the first search control unit is configured to generate a first PMI1 set for searching first PMI1 according to first initial values of the PMI parameter set, and output the first PMI1 set to the processing unit; the second search control unit is configured to generate second initial values of the PMI parameter set according to the determined first group of PMI parameters and the first initial values of the PMI parameter set, and output the second initial values of the PMI parameter set to the processing unit; the third search control unit is configured to generate third initial values of the PMI parameter set according to the determined second group of PMI parameters and the second initial values of the PMI parameter set; and the processing unit is configured to: search the first group of PMI parameters according to the first initial values of the PMI parameter set, and determine the first group of PMI parameters corresponding to the maximum capacity as a first group of reported values; search the second group of PMI parameters according to the second initial values of the PMI parameter set, and determine the second group of PMI parameters corresponding to the maximum capacity as a second group of reported values; and search a third group of PMI parameters according to the third initial values of the PMI parameter set, and determine the third group of PMI parameters corresponding to the maximum capacity as a third group of reported values.

BRIEF DESCRIPTION OF DRAWINGS

Accompanying drawings are provided for understanding of the technical solution of the disclosure and constitute a part of the specification. Hereinafter, these drawings are intended to explain the technical solution of the disclosure together with the following embodiments, but should not be considered as a limitation to the technical solution of the disclosure. In the drawings.

DETAIL DESCRIPTION OF EMBODIMENTS

In one configuration of the present application, a computing device includes one or more Central Processing Units (CPUs), input/output interfaces, network interfaces, and memories.

The memory may include a volatile memory, Random Access Memory (RAM), and/or a non-volatile memory such as Read-Only Memory (ROM) or flash RAM in a computer-readable medium. Memory is an example of the computer-readable medium.

The computer-readable medium includes persistent and non-persistent, removable and non-removable media that can realize information storage in any method or by any technique. The information may be computer-readable instructions, data structures, program modules, or other data. Examples of computer storage media include, but are not limited to, Phase-Change Random-Access Memory (PRAM), Static Random-Access Memory (SRAM), Dynamic Random Access Memory (DRAM), other types of RAM, Read-Only Memory (ROM), Electrically Erasable Programmable Read-Only Memory (EEPROM), flash memory or other memory technology, Compact Disc Read-Only Memory (CD-ROM), Digital Video Disc (DVD) or other optical storage, magnetic cassettes, tape disk storage or other magnetic storage devices, or any other non-transmission medium, which can be configured to store information that can be accessed by a computing device. As defined herein, the computer-readable medium does not include non-transitory computer-readable media (transitory media) such as modulated data signals and carrier waves.

Embodiments of the present application will be described below with reference to the accompanying drawings. It should be noted that the embodiments of the disclosure and features therein may be combined with each other in any manner as long as they are not contradictory.

Figure 1:
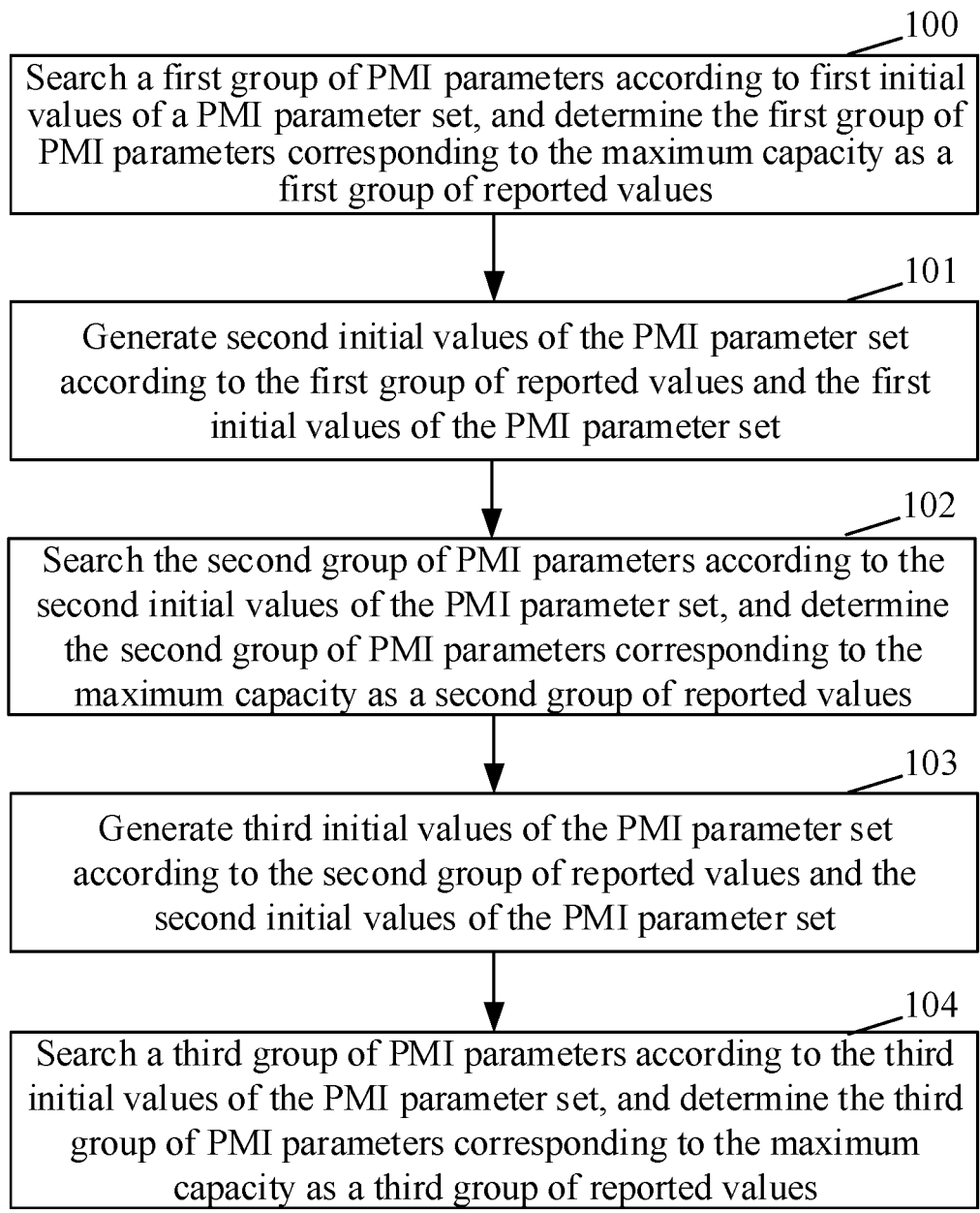
FIG. 1 is a flowchart of a method for acquiring a PMI according to the present application.

FIG. 1 is a flowchart of a method for acquiring a PMI according to the present application. As shown in FIG. 1, the method includes the following steps 100 to 104.

At step 100, search a first group of PMI parameters according to first initial values of a PMI parameter set, and determine the first group of PMI parameters corresponding to the maximum capacity as a first group of reported values.

In an illustrative example, the first group of PMI parameters includes: a first wideband precoding indicator (first PMI1, hereinafter also denoted as i11), and a second wideband precoding indicator (first PMI2, hereinafter also denoted as i12).

In an illustrative example, the first PMI1 and the first PMI2 may be searched separately, that is, searched respectively in sequence.

In an illustrative example, before step 100, the method further includes: generating the first initial values of the PMI parameter set, including: generating, according to current configuration parameters (which may include RI, antenna configuration, codebook configuration, and the like), initial values corresponding to the first PMI1 (i.e., i11), the first PMI2 (i.e., i12), a third wideband precoding indication (first PMI3, hereafter also denoted as i13), a second antenna panel fourth wideband precoding indication (first PMI4_1, hereafter also denoted as i14_1), a third antenna panel fourth wideband precoding indication (first PMI4_2, hereafter also denoted as i14_2), a fourth antenna panel fourth wideband precoding indication (first PMI4_3, hereafter also denoted as i14_3) and a subband precoding indication (second PMI, hereafter also denoted as i2).

In an exemplary example, taking the number of panels Ng=4, the number of antenna groups N1=2, N2=2, the oversampling parameters O1=4, O2=4, RI=2, and codebook mode 1 as an example, according to the related protocol of MP codebook in the related section of 3GPP, the available number of i11 in this case is Numi11=N1×O1=8, and values in the range of [0, (Numi11-1)]; the available number of i12 is Numi12=N2×O2=8, and values in the range of [0, (Numi12-1)]; the available number of i13 is Numi13=4, and values in the range of [0, (Numi13-1)]; the available number of i14_1 is Numi14_1=4, and values in the range of [0, (Numi14_1-1)]; the available number of i14_2 is Numi14_2=4, and values in the range of [0, (Numi14_2-1)]; the available number of i14_3 is Numi14_3=4, and values in the range of [0, (Numi14_3-1)]; and the available number of i2 is Numi2=2, and values in the range of [0,1]. Within the value ranges of the 7 PMI parameters, a value is selected respectively and randomly as a search initial value (i.e., first initial values of the PMI parameter set) for each of the 7 PMI parameters (i.e., the PMI parameter set), and respectively recorded as: $i11_{rand}$, $i12_{rand}$, $i13_{rand}$, $i14\_1_{rand}$, $i14\_2_{rand}$, $i14\_3_{rand}$ and $i2_{rand}$.

For a PMI parameter not having a search result before the current search, the random initial values are used in the current search step.

In an illustrative example, before step 100, the method further includes: estimating a channel coefficient matrix $H_k$ and a noise variance matrix $\sigma_k^2 I_8$ on each subcarrier according to pilot signals, such as CSI-RS.

In an illustrative example, step 100 may include: generating a first PMI1 set for searching the first PMI1 according to the first initial values of the PMI parameter set; calculating, according to the estimated channel coefficient matrix $H_k$ and noise variance matrix $\sigma_k^2 I_8$ and the first PMI1 set, channel capacities corresponding to respective PMI values in the first PMI1 set; selecting the first PMI1 corresponding to the maximum capacity and recording a reported value (hereafter may be denoted as $i11_{report}$) of the first PMI1; updating the first initial values of the PMI parameter set according to the recorded first PMI1, and generating a first PMI2 set for searching the first PMI2; calculating, according to the estimated channel coefficient matrix $H_k$ and noise variance matrix $\sigma_k^2 I_8$ and the first PMI2 set, channel capacities corresponding to respective PMI values in the first PMI2 set; selecting the first PMI2 corresponding to the maximum capacity and recording a reported value (hereafter may be denoted as $i12_{report}$) of the first PMI2; and taking the recorded $i11_{report}$ and $i12_{report}$ as the first group of reported values.

The first PMI1 set includes: [0~(Numi11-1)], $i12_{rand}$, $i13_{rand}$, $i14\_1_{rand}$, $i14\_2_{rand}$, $i14\_3_{rand}$ and $i2_{rand}$, where Numi11 is the available number of i11, and [0~(Numi11-1)] represents all values traversing within this range. The first PMI2 set includes: $i11_{report}$, [0~(Numi12-1)], $i13_{rand}$, $i14\_1_{rand}$, $i14\_2_{rand}$, $i14\_3_{rand}$ and $i2_{rand}$, where Numi12 is the available number of i12, and [0~(Numi12-1)] represents all values traversing within this range.

In another illustrative example, step 100 may include: generating a first PMI2 set for searching the first PMI2 according to the first initial values of the PMI parameter set; calculating, according to the estimated channel coefficient matrix $H_k$ and noise variance matrix $\sigma_k^2 I_8$ and the first PMI2 set, channel capacities corresponding to respective PMI values in the first PMI2 set; selecting the first PMI2 corresponding to the maximum capacity and recording a reported value (hereafter may be denoted as $i12_{report}$) of the first PMI2; updating the first initial values of the PMI parameter set according to the recorded first PMI2, and generating a first PMI1 set for searching the first PMI1; calculating, according to the estimated channel coefficient matrix $H_k$ and noise variance matrix $\sigma_k^2 I_8$ and the first PMI1 set, channel capacities corresponding to respective PMI values in the first PMI1 set; selecting the first PMI1 corresponding to the maximum capacity and recording a reported value (hereafter may be denoted as $i11_{report}$) of the first PMI1; and taking the recorded $i12_{report}$ and $i11_{report}$ as the first group of reported values.

The first PMI2 set includes: $i11_{rand}$, [0~(Numi12-1)], $i13_{rand}$, $i14\_1_{rand}$, $i14\_2_{rand}$, $i14\_3_{rand}$ and $i2_{rand}$. The first PMI1 set includes: [0~(Numi11-1)], $i12_{report}$, $i13_{rand}$, $i14\_1_{rand}$, $i14\_2_{rand}$, $i14\_3_{rand}$ and $i2_{rand}$.

At step 101, generate second initial values of the PMI parameter set according to the first group of reported values and the first initial values of the PMI parameter set.

In an illustrative example, corresponding PMI parameters in the first initial values of the PMI parameter set are replaced with the first group of PMI parameters (i.e., the first group of reported values) to obtain the second initial values of the PMI parameter set.

In an illustrative example, the recorded first group of PMI parameters includes: $i11_{report}$ and $i12_{report}$, and the first initial values of the PMI parameter set include: $i11_{rand}$, $i12_{rand}$, $i13_{rand}$, $i14\_1_{rand}$, $i14\_2_{rand}$, $i14\_3_{rand}$ and $i2_{rand}$. Therefore, the second initial values of the PMI parameter set include: $i11_{report}$, $i12_{report}$, $i13_{rand}$, $i14\_1_{rand}$, $i14\_2_{rand}$, $i14\_3_{rand}$, and $i2_{rand}$.

At step 102, search the second group of PMI parameters according to the second initial values of the PMI parameter set, and determine the second group of PMI parameters corresponding to the maximum capacity as a second group of reported values.

In an illustrative example, when the number of panels Ng=4, the second group of PMI parameters includes: first PMI4_1 (hereinafter also denoted as i14_1), first PMI4_2 (hereinafter also denoted as i14_2), and first PMI4_3 (hereinafter also denoted as i14_3).

In an illustrative example, when the number of panels Ng=2, the second group of PMI parameters includes: first PMI4_1 (hereinafter also denoted as i14_1).

In an illustrative example, the second group of PMI parameters includes: first PMI4_1, and step 102 may include: generating a first PMI4_1 set for searching the first PMI4_1 according to the second initial values of the PMI parameter set; calculating, according to the estimated channel coefficient matrix $H_k$ and noise variance matrix $\sigma_k^2 I_8$ and the first PMI4_1 set, channel capacities corresponding to respective PMI values in the first PMI4_1 set; selecting the first PMI4_1 corresponding to the maximum capacity and recording a reported value (hereafter may be denoted as $i14\_1_{report}$) of the first PMI4_1; and taking the recorded $i14\_1_{report}$ as the second group of reported values.

The first PMI4_1 set includes: $i11_{report}$, $i12_{report}$, $i13_{rand}$, [0~(Numi14_1-1)] and $i2_{rand}$, where Numi14_1 is the available number of i14_1, and [0~(Numi14_1-1)] represents all values traversing within this range.

In another illustrative example, the second group of PMI parameters includes first PMI4_1, first PMI4_2 and first PMI4_3. It should be noted that the three PMIs in the second group of PMI parameters may be searched in an order with any combination.

Step 102 may include: generating a first PMI4_x set for searching the first PMI4_x according to the second initial values of the PMI parameter set; calculating, according to the estimated channel coefficient matrix $H_k$ and noise variance matrix $\sigma_k^2 I_8$ and the first PMI4_x set, channel capacities corresponding to respective PMI values in the first PMI4_x set; selecting the first PMI4_x corresponding to the maximum capacity and recording a reported value (hereafter may be denoted as $i14\_x_{report}$) of the first PMI4_x; and generating a first PMI4_y set for searching the first PMI4_y according to the second initial values of the PMI parameter set and the reported value of the first PMI4_x; calculating, according to the estimated channel coefficient matrix $H_k$ and noise variance matrix $\sigma_k^2 I_8$ and the first PMI4_y set, channel capacities corresponding to respective PMI values in the first PMI4_y set; selecting the first PMI4_y corresponding to the maximum capacity and recording a reported value (hereafter may be denoted as $i14\_y_{report}$) of the first PMI4_y; generating a first PMI4_z set for searching the first PMI4_z according to the second initial values of the PMI parameter set, the reported values of the first PMI4_x and the reported values of the first PMI4_y; calculating, according to the estimated channel coefficient matrix $H_k$ and noise variance matrix $\sigma_k^2 I_8$ and the first PMI4_z set, channel capacities corresponding to respective PMI values in the first PMI4_z set; selecting the first PMI4_z corresponding to the maximum capacity and recording a reported value (hereafter may be denoted as $i14\_z_{report}$) of the first PMI4_z; and taking the recorded $i14\_x_{report}$, $i14\_y_{report}$, and $i14\_z_{report}$ as a second group of reported values, where x, y and z are any combination of 1, 2 and 3, for example: x=1, y=2, and z=3; for another example: x=3, y=1, and z=2; for still another example: x=1, y=3, and z=2, and so on.

Taking x=1, y=2, and z=3 as an example, the first PMI4_1 set includes: $i11_{report}$, $i12_{report}$, $i13_{rand}$, [0 to (Numi14_1-1)], $i14\_2_{rand}$, $i14\_3_{rand}$ and $i2_{rand}$, where Numi14_1 is the available number of i14_1, and [0~(Numi14_1-1)] represents all values traversing within this range; the first PMI4_2 set includes: $i11_{report}$, $i12_{report}$, $i13_{rand}$, $i14\_1_{report}$, [0~(Numi14_2-1)], $i14\_3_{rand}$ and $i2_{rand}$, where Numi14_2 is the available number of i14_2, and [0~(Numi14_2-1)] represents all values traversing within this range; and the first PMI4_3 set includes: $i11_{report}$, $i12_{report}$, $i13_{rand}$, $i14\_1_{report}$, i14_2$_{report}$, [0~(Numi14_3-1)], and i2$_{rand}$, where Numi14_3 is the available number of i14_3, and [0~(Numi14_3-1)] represents all values traversing within this range.

At step 103, generate third initial values of the PMI parameter set according to the second group of reported values and the second initial values of the PMI parameter set.

In an illustrative example, corresponding PMI parameters in the second initial values of the PMI parameter set are replaced with the second group of PMI parameters (i.e., the second group of reported values) to obtain the third initial values of the PMI parameter set.

In one illustrative example, the recorded second group of PMI parameters includes i14_1$_{report}$, i14_2$_{report}$ and i14_3$_{report}$, and the second initial values of the PMI parameter set include: i11$_{report}$, i12$_{report}$, i13$_{rand}$, i14_1$_{rand}$, i14_2$_{rand}$, i14_3$_{rand}$ and i2$_{rand}$. Therefore, the third initial values of the PMI parameter set include: i11$_{report}$, i12$_{report}$, i13$_{rand}$, i14_1$_{report}$, i14_2$_{report}$, i14_3$_{report}$ and i2$_{rand}$.

At step 104, search a third group of PMI parameters according to the third initial values of the PMI parameter set, and determine the third group of PMI parameters corresponding to the maximum capacity as a third group of reported values.

In an illustrative example, the third group of PMI parameters includes the first PMI3 (hereinafter also denoted as i13) and the second PMI (hereinafter also denoted as i2).

In an illustrative example, a first PMI3-second PMI set for searching the first PMI3 and the second PMI is generated according to the third initial values of the PMI parameter set; channel capacities corresponding to respective PMI values in the first PMI3-second PMI set are calculated according to the estimated channel coefficient matrix H$_k$ and noise variance matrix $\sigma_k^2 I_8$ and the first PMI3-second PMI set; the first PMI3 and the second PMI corresponding to the maximum capacity are selected and a reported value of the first PMI3 (hereafter also denoted as i13$_{report}$) and a reported value of the second PMI (hereafter also denoted as i2$_{report}$) are recorded; and the recorded i13$_{report}$ and i2$_{report}$ on are taken as the third group of reported values.

The first PMI3-second PMI set includes: i11$_{report}$, i2$_{report}$, [0~(Numi13-1)], i14_1$_{report}$, i14_2$_{report}$, i14_3$_{report}$ and [0~(Numi2-1)], where Numi13 is the available number of i13, and [0~(Numi13-1)] represents all values traversing within this range; Numi2 is the available number of i2, and [0~(Numi2-1)] represents all values traversing within this range.

It should be noted that the first PMI3 parameter does not need to be reported when RI=1.

By acquiring the PMI in a grading manner, the present application greatly reduces the calculation times for acquiring the PMI while ensuring the search performance, thereby improving the processing speed of the mobile terminal and reducing the hardware implementation difficulty.

Optionally, in an illustrative example, after generating the first initial values of the PMI parameter set and before step 100, the method for acquiring a PMI of the present application further includes: generating a first PMI2 preset for pre-searching the first PMI2 according to the first initial values of the PMI parameter set; calculating, according to the estimated channel coefficient matrix H$_k$ and noise variance matrix $\sigma_k^2 I_8$ and the first PMI2 preset, channel capacities corresponding to respective PMI values in the first PMI2 preset; selecting the first PMI2 corresponding to the maximum capacity and recording a reported value (hereafter may be denoted as i12$_{save}$) of the first PMI2; and updating the first initial values of the PMI parameter set according to the recorded first PMI2.

In an illustrative example, the step of generating the first PMI2 preset for pre-searching the first PMI2 includes: using the initial values of 7 parameters, i.e., {i11$_{rand}$, i12$_{rand}$, i13$_{rand}$, i14_1$_{rand}$, i14_2$_{rand}$, i14_3$_{rand}$, i2$_{rand}$} for the first calculation (the PMI parameters are arranged in the order of {first PMI1 i11, first PMI2 i12, first PMI3 i13, first PMI4_1 i14_1, first PMI4_2 i14_2, first PMI4_3 i14_3, second PMI i2}), using PMI parameters {(i11$_{rand}$+N−1)mod(Numi11), (i12$_{rand}$+N−1)mod(Numi12), i13$_{rand}$, i14_1$_{rand}$, i14_2$_{rand}$, i14_3$_{rand}$, i2$_{rand}$} for the N$^{th}$ calculation, so on and so forth, until the last calculation, i.e., using PMI parameters {(i11$_{rand}$+Numi12-1)mod(Numi11), (i12$_{rand}$+Numi12-1)mod(Numi12), i13$_{rand}$, i14_1$_{rand}$, i14_2$_{rand}$, i14_3$_{rand}$, i2$_{rand}$} for the Numi12$^{th}$ calculation.

In an illustrative example, the step of selecting the first PMI2 corresponding to the maximum capacity and recording the reported value (hereafter may be denoted as i12$_{save}$) of the first PMI2 includes: selecting the maximum value of all calculated Numi12 channel capacities, and recording the first PMI2 parameter, denoted as i12$_{save}$, used for the maximum capacity.

In an illustrative example, the first initial values of the PMI parameter set are respectively denoted as: i11$_{rand}$, i12$_{rand}$, i13$_{rand}$, i14_1$_{rand}$, i14_2$_{rand}$, i14_3$_{rand}$ and i2$_{rand}$. After being updated by pre-searching the first PMI2, the first initial values of the PMI parameter set are respectively denoted as: i11$_{rand}$, i12$_{save}$, i13$_{rand}$, i14_1$_{rand}$, i14_2$_{rand}$, i14_3$_{rand}$ and i2$_{rand}$.

If the pre-search of the first PMI2 is included before step 100, then the first initial values of the PMI parameter set used in step 100 is the updated first initial values of the PMI parameter set, including: i11$_{rand}$, i12$_{save}$, i13$_{rand}$, i14_1$_{rand}$, i14_2$_{rand}$, i14_3$_{rand}$ and i2$_{rand}$.

Optionally, in an illustrative example, after pre-searching the first PMI2 and before step 100, the method for acquiring a PMI of the present application further includes: generate a first PMI4 preset for pre-searching the first PMI4 according to the current first initial values of the PMI parameter set; calculating, according to the estimated channel coefficient matrix H$_k$ and noise variance matrix $\sigma_k^2 I_8$ and the first PMI4 preset, channel capacities corresponding to respective PMI values in the first PMI4 preset; selecting the first PMI4 corresponding to the maximum capacity and recording a value of the first PMI4; and updating the first initial values of the PMI parameter set according to the recorded first PMI4.

In an illustrative example, for the case when the number of panels Ng=4, the first PMI4 parameter includes: first PMI4_1 (hereinafter also denoted as i14_1), first PMI4_2 (hereinafter also denoted as i14_2), and first PMI4_3 (hereinafter also denoted as i14_3), and the pre-search of the first PMI2 has been performed, generating the first PMI4 preset for pre-searching the first PMI4 includes: the first initial values of the PMI parameter set including {i11$_{rand}$, i12$_{save}$, i13$_{rand}$, i14_1$_{rand}$, i14_2$_{rand}$, i14_3$_{rand}$, i2$_{rand}$}, and three rounds of first PMI4 presets are generated according to the first initial value of the PMI parameter set: the first round uses a fixed initial i14 spacing pattern {a', b', c'} in group 1, that is, the first calculation uses initial values {i11$_{rand}$, i12$_{save}$, i13$_{rand}$, i14_1$_{rand}$+a', i14_2$_{rand}$+b', i14_3$_{rand}$+c', i2$_{rand}$}, the N$^{th}$ calculation uses PMI parameters {i11$_{rand}$, i12$_{save}$, i13$_{rand}$, (i14_1$_{rand}$+N−1+a')mod(Numi14_1), i14_2$_{rand}$+N−1+b')mod(Numi14_2), i14_3$_{rand}$+N−1+c')mod(Numi14_3), i2$_{rand}$}, so on and so forth, until the fourth calculation in the first round; the second round uses a random initial i14 spacing pattern in group 2, i.e., randomly selects a group of patterns from the group 2 random initial pattern set, such as {a", b" and c"}, that is, the first calculation uses initial values {i11$_{rand}$, i12$_{save}$, i13$_{rand}$, i14_1$_{rand}$+a", i14_2$_{rand}$b", i14_3$_{rand}$+c", i2$_{rand}$}, the N$^{th}$ calculation uses PMI parameters {i11$_{rand}$, i12$_{save}$, i13$_{rand}$, (i14_1$_{rand}$+N−1+a")mod(Numi14_1), (i14_2$_{rand}$+N−1+b")mod(Numi14_2), i14_3$_{rand}$+N−1+c")mod(Numi14_3), i2$_{rand}$}, so on and so forth, until the fourth calculation in the second round; and the third round uses a random initial i14 spacing pattern in group 3, i.e., randomly selects a group of patterns from the group 3 random initial pattern set, such as {a''', b''', c'''}, that is, the first calculation uses initial values {i11$_{rand}$, i12$_{save}$, i13$_{rand}$, i14_1$_{rand}$+a''', i14_2$_{rand}$+b''', i14_3$_{rand}$+c''', i2$_{rand}$}, the N$^{th}$ calculation uses PMI parameters {i11$_{rand}$, i12$_{save}$, i13$_{rand}$, (i14_1$_{rand}$+N−1+a''')mod(Numi14_1), (i14_2$_{rand}$+N−1+b''')mod(Numi14_2), (i14_3$_{rand}$+N−1+c''')mod(Numi14_3), i2$_{rand}$}, so on and so forth, until the fourth calculation in the third round.

In an illustrative example, in the pre-search of first PMI4, the method further includes: configuring the number of search rounds and/or configuring a function of random pattern selection.

In an illustrative example, the step of calculating, according to the estimated channel coefficient matrix $H_k$ and noise variance matrix $\sigma_k^2 I_8$ and the first PMI4 preset, channel capacities corresponding to respective PMI values in the first PMI4 preset may include: generating a corresponding precoding matrix WN according to the related configuration parameters and the N$^{th}$ input PMI parameters, and then calculating channel capacities and $Cap_N$ corresponding to respective subcarriers by combining the channel coefficient matrix $H_k$ and the noise variance matrix $\sigma_k^2 I_8$.

In an illustrative example, the step of selecting the first PMI4 corresponding to the maximum capacity and recording the value of the first PMI4 may include: selecting the maximum value of 3×4 calculated channel capacities, and recording the first PMI4 parameters, denoted as i14_1$_{save}$, i14_2$_{save}$ and i14_3$_{save}$ used for the maximum capacity.

In an illustrative example, after being updated by pre-searching the first PMI4, the first initial values of the PMI parameter set are respectively denoted as: i11$_{rand}$, i12$_{save}$, i13$_{rand}$, i14_1$_{save}$, i14_2$_{save}$, i14_3$_{save}$ and i2$_{rand}$.

When Ng=2, since there is only one i14_1 parameter, the 4 possible parameters may be directly traversed to perform pre-search of the first PMI4, instead of performing multi-pattern search.

If the pre-search of the first PMI2 and the first PMI4 is included before step 100, the first initial values of the PMI parameter set used in step 100 are the first initial values of the PMI parameter set updated by pre-searching the first PMI2 and the first PMI4, and includes: i11$_{rand}$, i12$_{save}$, i13$_{rand}$, i14_1$_{rand}$, i14_2$_{rand}$, i14_3$_{rand}$ and i2$_{rand}$.

If the pre-search of the first PMI2 is not performed before the pre-search of the first PMI4, then the first initial values of the PMI parameter set used in the pre-search of the first PMI4 are: i11$_{rand}$, i12$_{rand}$, i13$_{rand}$, i14_1$_{rand}$, i14_2$_{rand}$, i14_3$_{rand}$ and i2$_{rand}$. At this time, the first initial values of the PMI parameter set used in step 100 are the first initial values of the PMI parameter set updated by pre-searching the first PMI4, and includes: i11$_{rand}$, i12$_{rand}$, i13$_{rand}$, i14_1$_{save}$, i14_2$_{save}$, i14_3$_{save}$ and i2$_{rand}$.

In the pre-search process further included in this application, an approximate range of first PMI2 is firstly determined, and then multi-pattern pre-search of first PMI4 is further performed on the basis of the pre-search of first PMI2, which affectively avoided final PMI selection performance degradation due to a capacity "flat bottom" effect caused by phase primary selection errors between broadband beams and broadband panels.

In the present application, by adopting the method of firstly pre-searching first PMI2 and first PMI4 and then performing a fine search shown in FIG. 1, on one hand, final PMI selection performance degradation caused by primary selection errors of beams and phases is avoided, and on the other hand, the fine search further adopts a three-level separated search form (i.e., the first PMI1, the first PMI2 and the first PMI4) and a combined detection mode of the first PMI3-second PMI, thereby effectively reducing the number of PMI search while ensuring the search performance, improving the processing speed of the mobile terminal and reducing the hardware implementation difficulty.

The present application determines accurate first PMI1/2/4 through further separated fine searches, and then determines accurate first PMI3 and second PMI through combined detection of the first PMI3-second PMI, thereby reducing the number of calculation feedback from terminal PMI while ensuring that the search performance is basically consistent with traversal search. Taking the PMI search with RI=2 in the codebook configuration that the number of antenna panels is 4, 2 groups of antennas in horizontal and vertical directions, respectively, and the spatial sampling multiple is 4 as an example, pre-search of the first PMI2 and the first PMI4 (assuming three-round coarse search is adopted) requires 2×4+3×4=20 times of search; and the fine searches, which further adopts a three-level separated search form, i.e., the first PMI1, the first PMI2 and the first PMI4, and the combined detection mode of the first PMI3-second PMI, requires 2×4+2×4+3×4+4×2=36 times of search in total. In this manner, the 2×4×2×4×4×4×4×2=32768 times of traversal search in the related art is reduced to 20+36=56 times of search, and experimental data proves that the optimal PMI value is obtained within fewer times of search with the present application.

The present disclosure further provides a computer-readable storage medium with computer-executable instructions stored thereon. The computer-executable instructions are configured to cause steps of the method for acquiring a PMI according to any of the above embodiments to be implemented.

The present disclosure further provides an apparatus for acquiring a PMI, including a processor and a memory. The memory has stored thereon a computer program operable on the processor to: cause steps of the method for acquiring a PMI according to any of the above embodiments to be implemented.

The present application further provides a mobile terminal including the apparatus for acquiring a PMI according to any of the above embodiments.

Figure 2:
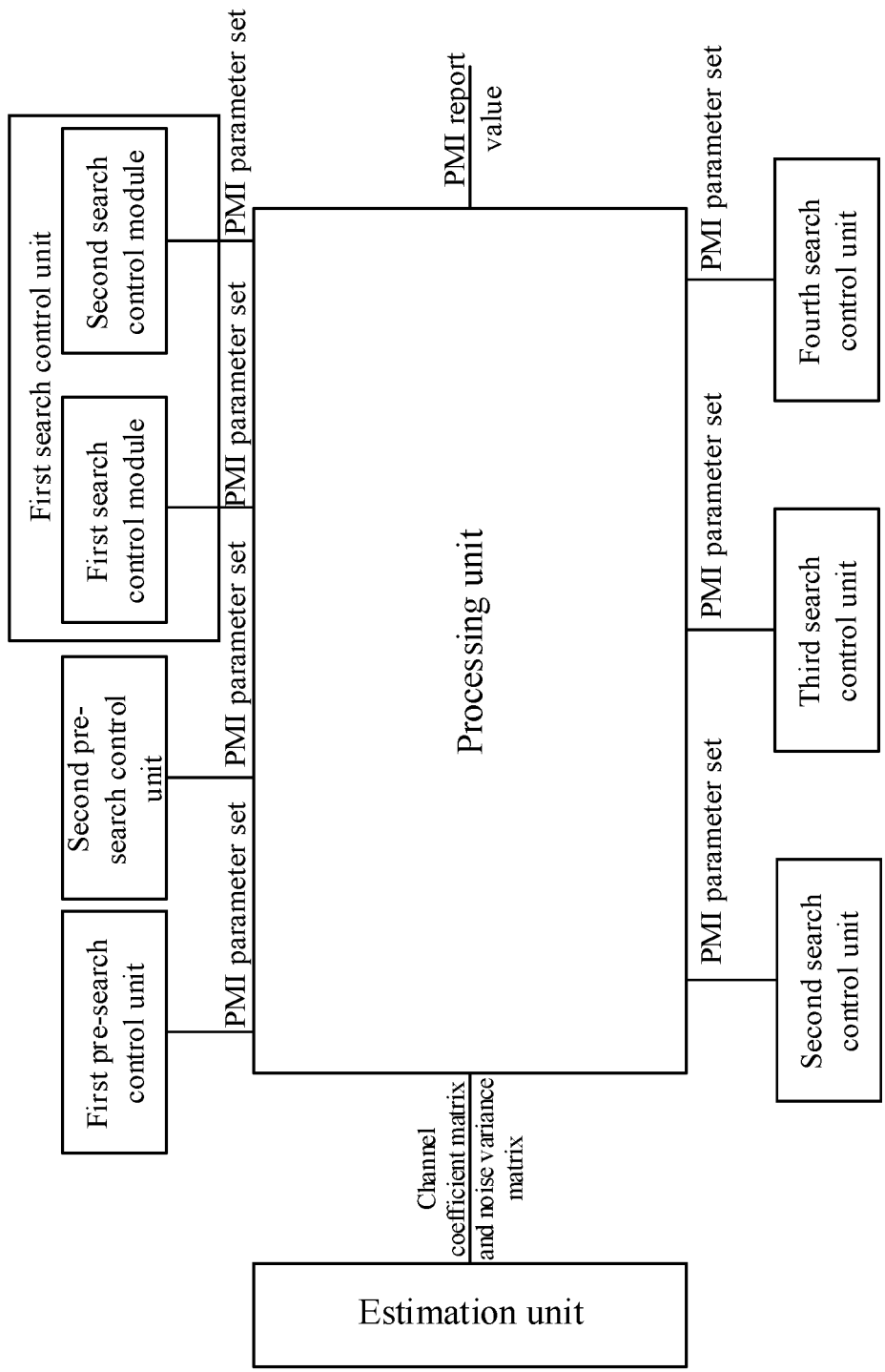
FIG. 2 is a schematic structural diagram of an apparatus for acquiring a PMI according to the present application.

FIG. 2 is a schematic structural diagram of an apparatus for acquiring a PMI according to the present application. As shown in FIG. 2, the apparatus includes at least: a processing unit, a first search control unit, a second search control unit and a third search control unit. The first search control unit is configured to generate a first PMI1 set for searching first PMI1 according to first initial values of the PMI parameter set, and output the first PMI1 set to the processing unit.

The second search control unit is configured to generate second initial values of the PMI parameter set according to the determined first group of PMI parameters and the first initial values of the PMI parameter set, and output the second initial values of the PMI parameter set to the processing unit.

The third search control unit is configured to generate third initial values of the PMI parameter set according to the determined second group of PMI parameters and the second initial values of the PMI parameter set.

The processing unit is configured to: search the first group of PMI parameters according to the first initial values of the PMI parameter set, and determine the first group of PMI parameters corresponding to the maximum capacity as a first group of reported values; search the second group of PMI parameters according to the second initial values of the PMI parameter set, and determine the second group of PMI parameters corresponding to the maximum capacity as a second group of reported values; and search a third group of PMI parameters according to the third initial values of the PMI parameter set, and determine the third group of PMI parameters corresponding to the maximum capacity as a third group of reported values.

In an illustrative example, the apparatus for acquiring a PMI of the present application further includes an estimation unit configured to estimate a channel coefficient matrix $H_k$ and a noise variance matrix $\sigma_k^2 I_8$ on each subcarrier according to pilot signals, such as CSI-RS.

In an illustrative example, the first search control unit includes a first search control module and a second search control module.

The first search control module is configured to generate a first PMI1 set for searching the first PMI1 according to first initial values of the PMI parameter set, and output the first PMI1 set to the processing unit. The processing unit is configured to: calculate, according to the estimated channel coefficient matrix $H_k$ and noise variance matrix $\sigma_k^2 I_8$ and the first PMI1 set, channel capacities corresponding to respective PMI values in the first PMI1 set; and select the first PMI1 corresponding to the maximum capacity and record a reported value (hereafter may be denoted as $i11_{report}$) of the first PMI1.

The second search control module is configured to update the first initial values of the PMI parameter set according to the recorded first PMI1, and generate a first PMI2 set for searching the first PMI2 and output the first PMI2 set to the processing unit. The processing unit is configured to: calculate, according to the estimated channel coefficient matrix $H_k$ and noise variance matrix $\sigma_k^2 I_8$ and the first PMI2 set, channel capacities corresponding to respective PMI values in the first PMI2 set; select the first PMI2 corresponding to the maximum capacity and record a reported value (hereafter may be denoted as $i12_{report}$) of the first PMI2; and take the recorded $i11_{report}$ and $i12_{report}$ as the first group of reported values.

In another illustrative example, the first search control unit includes a first search control module and a second search control module.

The second search control module is configured to generate a first PMI2 set for searching the first PMI2 according to first initial values of the PMI parameter set, and output the first PMI2 set to the processing unit. The processing unit is configured to: calculate, according to the estimated channel coefficient matrix $H_k$ and noise variance matrix $\sigma_k^2 I_8$ and the first PMI2 set, channel capacities corresponding to respective PMI values in the first PMI2 set; select the first PMI2 corresponding to the maximum capacity and record a reported value (hereafter may be denoted as $i12_{report}$) of the first PMI2.

The first search control module is configured to update the first initial values of the PMI parameter set according to the recorded first PMI2, and generate a first PMI1 set for searching the first PMI1 and output the first PMI1 set to the processing unit. The processing unit is configured to: calculate, according to the estimated channel coefficient matrix $H_k$ and noise variance matrix $\sigma_k^2 I_8$ and the first PMI1 set, channel capacities corresponding to respective PMI values in the first PMI1 set; select and record the first PMI1 corresponding to the maximum capacity; and take the recorded $i12_{report}$ and $i11_{report}$ on as the first group of reported values.

In an illustrative example, the first group of PMI parameters includes first PMI1 (hereinafter also denoted as i11) and first PMI2 (hereinafter also denoted as i12).

In an illustrative example, the second search control unit is configured to: replace corresponding PMI parameters in the first initial values of the PMI parameter set with the recorded first group of PMI parameters to obtain the second initial values of the PMI parameter set and output the second initial values of the PMI parameter set to the processing unit. The processing unit is configured to: generate a first PMI4_1 set for searching the first PMI4_1 according to the second initial values of the PMI parameter set; calculate, according to the estimated channel coefficient matrix $H_k$ and noise variance matrix $\sigma_k^2 I_8$ and the first PMI4_1 set, channel capacities corresponding to respective PMI values in the first PMI4_1 set; select the first PMI4_1 corresponding to the maximum capacity and record a reported value (hereafter may be denoted as $i14\_1_{report}$) of the first PMI4_1; and take the recorded $i14\_1_{report}$ as the second group of reported values. Alternatively, the processing unit is configured to: generate a first PMI4_x set for searching the first PMI4_x according to the second initial values of the PMI parameter set; calculate, according to the estimated channel coefficient matrix $H_k$ and noise variance matrix $\sigma_k^2 I_8$ and the first PMI4_x set, channel capacities corresponding to respective PMI values in the first PMI4_x set; select the first PMI4_x corresponding to the maximum capacity and record a reported value (hereafter may be denoted as $i14\_x_{report}$) of the first PMI4_x; and generate a first PMI4_y set for searching the first PMI4_y according to the second initial values of the PMI parameter set and the reported value of the first PMI4_x; calculate, according to the estimated channel coefficient matrix $H_k$ and noise variance matrix $\sigma_k^2 I_8$ and the first PMI4_y set, channel capacities corresponding to respective PMI values in the first PMI4_y set; select the first PMI4_y corresponding to the maximum capacity and record a reported value (hereafter may be denoted as $i14\_y_{report}$) of the first PMI4_y; generate a first PMI4_z set for searching the first PMI4_z according to the second initial values of the PMI parameter set, the reported values of the first PMI4_x and the reported values of the first PMI4_y; calculate, according to the estimated channel coefficient matrix $H_k$ and noise variance matrix $\sigma_k^2 I_8$ and the first PMI4_z set, channel capacities corresponding to respective PMI values in the first PMI4_z set; select the first PMI4_z corresponding to the maximum capacity and record a reported value (hereafter may be denoted as $i14\_z_{report}$) of the first PMI4_z; and take the recorded $i14\_x_{report}$, $i14\_y_{report}$, and $i14\_z_{report}$ on as a second group of reported values, where x, y and z are any combination of 1, 2 and 3, for example: x=1, y=2, and z=3; for another example: x=3, y=1, and z=2; for still another example: x=1, y=3, and z=2, and so on.

In an illustrative example, when the number of panels Ng=4, the second group of PMI parameters includes: first PMI4_1 (hereinafter also denoted as i14_1), first PMI4_2 (hereinafter also denoted as i14_2), and first PMI4_3 (hereinafter also denoted as i14_3).

In an illustrative example, when the number of panels Ng=2, the second group of PMI parameters includes: first PMI4_1 (hereinafter also denoted as i14_1).

In an illustrative example, the third search control unit is configured to: replace corresponding PMI parameters in the second initial values of the PMI parameter set with the recorded second group of PMI parameters to obtain the third initial values of the PMI parameter set and output the third initial values of the PMI parameter set to the processing unit. The processing unit is configured to: generate a first PMI3-second PMI set for searching the first PMI3 and the second PMI according to the third initial values of the PMI parameter set; calculate, according to the estimated channel coefficient matrix $H_k$ and noise variance matrix $\sigma_k^2 I_8$ and the first PMI3-second PMI set, channel capacities corresponding to respective PMI values in the first PMI3-second PMI set; select the first PMI3 and the second PMI corresponding to the maximum capacity and record a reported value of the first PMI3 (hereafter also denoted as $i13_{report}$) and a reported value of the second PMI (hereafter also denoted as $i2_{report}$); and take the recorded $i13_{report}$ and $i2_{report}$ as the third group of reported values.

It should be noted that the first PMI3 parameter does not need to be reported when RI=1.

In an illustrative example, the third group of PMI parameters includes the first PMI3 (hereinafter also denoted as i13) and the second PMI (hereinafter also denoted as i2).

Optionally, in an illustrative example, the apparatus for acquiring a PMI of the present application further includes: a first pre-search control unit and/or a second pre-search control unit.

The first pre-search control unit is configured to: generate a first PMI2 preset for pre-searching the first PMI2 according to the first initial values of the PMI parameter set; calculate, according to the estimated channel coefficient matrix $H_k$ and noise variance matrix $\sigma_k^2 I_8$ and the first PMI2 preset, channel capacities corresponding to respective PMI values in the first PMI2 preset; select the first PMI2 corresponding to the maximum capacity and record a reported value (hereafter may be denoted as $i12_{save}$) of the first PMI2; and update the first initial values of the PMI parameter set according to the recorded first PMI2.

The second pre-search control unit is configured to: generate a first PMI4 preset for pre-searching the first PMI4 according to the current first initial values of the PMI parameter set; calculate according to the estimated channel coefficient matrix $H_k$ and noise variance matrix $\sigma_k^2 I_8$ and the first PMI4 preset, channel capacities corresponding to respective PMI values in the first PMI4 preset; select the first PMI4 corresponding to the maximum capacity and record a value of the first PMI4; and update the first initial values of the PMI parameter set according to the recorded first PMI4.

In an illustrative example, for the case when the number of panels Ng=4, the first PMI4 parameter includes: first PMI4_1 (hereinafter also denoted as i14_1), first PMI4_2 (hereinafter also denoted as i14_2), and first PMI4_3 (hereinafter also denoted as i14_3), and the pre-search of the first PMI2 has been performed, the second pre-search control unit is configured to: generate three rounds of first PMI4 presets according to the first initial values of the PMI parameter set, the first initial values of the PMI parameter set including $\{i11_{rand}, i12_{save}, i13_{rand}, i14\_1_{rand}, i14\_2_{rand}, i14\_3_{rand}, i2_{rand}\}$: using a fixed initial i14 spacing pattern $\{a', b', c'\}$ in group 1 in the first round, that is, using initial values $\{i11_{rand}, i12_{save}, i13_{rand}, i14\_1_{rand}+a', i14\_2_{rand}+b', i14\_3_{rand}+c', i2_{rand}\}$ in the first calculation, using PMI parameters $\{i11_{rand}, i12_{save}, i13_{rand}, (i14\_1_{rand}+N-1+a')$ mod(Numi14_1), $i14\_2_{rand}+N-1+b')$mod(Numi14_2), $(i14\_3_{rand}+N-1+c')$mod(Numi14_3), $i2_{rand}\}$ in the $N^{th}$ calculation, so on and so forth, until the fourth calculation in the first round; using a random initial i14 spacing pattern in group 2 in the second round, i.e., randomly selecting a group of patterns from the group 2 random initial pattern set, such as $\{a'', b''$ and $c''\}$, that is, using initial values $\{i11_{rand}, i12_{save}, i13_{rand}, i14\_1_{rand}+a'', i14\_2_{rand}b'', i14\_3_{rand}+c'', i2_{rand}\}$ in the first calculation, using PMI parameters $\{i11_{rand}, i12_{save}, i13_{rand}, (i14\_1_{rand}+N-1+a'')$mod(Numi14_1), $(i14\_2_{rand}+N-1+b'')$mod(Numi14_2), $(i14\_3_{rand}+N-1+c'')$mod(Numi14_3), $i2_{rand}\}$ in the $N^{th}$ calculation, so on and so forth, until the fourth calculation in the second round; and using a random initial i14 spacing pattern in group 3 in the third round, i.e., randomly selecting a group of patterns from the group 3 random initial pattern set, such as $\{a''', b''', c'''\}$, that is, using initial values $\{i11_{rand}, i12_{save}, i13_{rand}, i14\_1_{rand}+a''', i14\_2_{rand}b''', i14\_3_{rand}+c''', i2_{rand}\}$ in the first calculation, using PMI parameters $\{i11_{rand}, i12_{save}, i13_{rand}, (i14\_1_{rand}+N-1+a''')$mod(Numi14_1), $(i14\_2_{rand}+N-1+b''')$mod(Numi14_2), $(i14\_3_{rand}+N-1+c''')$mod(Numi14_3), $i2_{rand}\}$ in the $N^{th}$ calculation, so on and so forth, until the fourth calculation in the third round.

When Ng=2, since there is only one i14_1 parameter, the 4 possible parameters may be directly traversed to perform pre-search of the first PMI4, instead of performing multi-pattern search, which is not repeated here.

Figure 3:
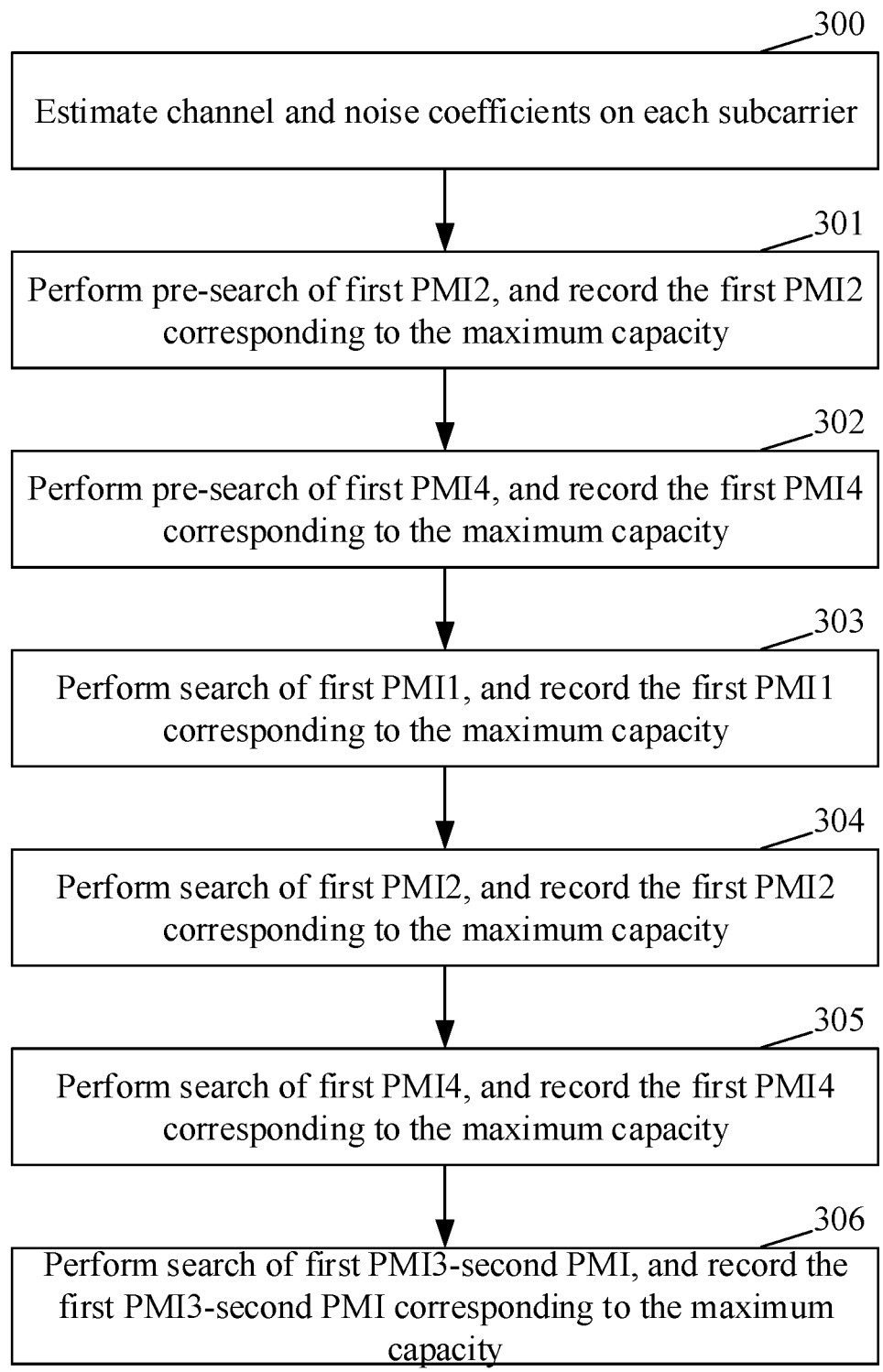
FIG. 3 is a flowchart illustrating a method for acquiring a PMI according to the present application.

FIG. 3 is a flowchart illustrating a method for acquiring a PMI according to the present application. An implementation of the method for acquiring a PMI according to the present application is described below by taking an MP 5G system with the number of panels Ng=4, the number of antenna groups N1=2, N2=2, the oversampling parameters O1=4, O2=4, RI=2, and 32 transmitting antenna ports and 8 receiving antenna ports of codebook mode 1 as an example. As shown in FIG. 3, the method includes the following steps 300 to 306.

At step 300, estimate channel and noise coefficients on each subcarrier.

A channel coefficient matrix $H_k$ and a noise variance matrix $\sigma_k^2 I_8$ on the $k^{th}$ subcarrier is estimated from CSI-RS, where $$H_k = \begin{bmatrix} h_{0,0} & h_{0,1} & \cdots & h_{0,31} \\ h_{1,0} & h_{1,1} & \cdots & h_{1,31} \\ \vdots & \vdots & \ddots & \vdots \\ h_{7,0} & h_{7,1} & \cdots & h_{7,31} \end{bmatrix};$$

$$\sigma_k^2 I_8 = \begin{bmatrix} \sigma_{0,0}^2 & 0 & \cdots & 0 \\ 0 & \sigma_{1,1}^2 & \cdots & 0 \\ \cdots & \cdots & \cdots & \cdots \\ 0 & 0 & \cdots & \sigma_{7,7}^2 \end{bmatrix},$$

where $h_{i,j}$ is the channel coefficient from the $j^{th}$ transmitting antenna port to the $i^{th}$ receiving antenna, and $\sigma_{i,i}$ is the noise power on the $i^{th}$ receiving antenna.

At step 301, perform pre-search of first PMI2, and record the first PMI2 corresponding to the maximum capacity.

A PMI parameter set required for each capacity calculation is generated, and the corresponding channel capacities are calculated according to the channel and noise coefficients obtained in step 300 and the PMI parameter set, and compared to select the PMI parameter corresponding to the maximum capacity. The implementation process is described below.

First, according to the current RI, antenna configuration, and codebook configuration, initial values (i.e., first initial values of the PMI parameter set) corresponding to the first PMI1 (i.e., i11), the first PMI2 (i.e., i12), the first PMI3 (i.e., i13), the first PMI4_1 (i.e., i14_1), the first PMI4_2 (i.e., i14_2), the first PMI4_3 (i.e., i14_3), and the second PMI (i.e., i2) are generated. The generation method may include: with the number of panels Ng=4, the number of antenna groups N1=2, N2=2, the oversampling parameters O1=4, O2=4, RI=2, and codebook mode 1, according to the related protocol of MP codebook in section 5.2.2.2.2 of 3GPP 38.214 V15.5.0, the available number of i11 is Numi11=N1×O1=8, and values in the range of [0, (Numi11-1)]; the available number of i12 is Numi12=N2×O2=8, and values in the range of [0, (Numi12-1)]; the available number of i13 is Numi13=4, and values in the range of [0, (Numi13-1)]; the available number of i14_1 is Numi14_1=4, and values in the range of [0, (Numi14_1-1)]; the available number of i14_2 is Numi14_2=4, and values in the range of [0, (Numi14_2-1)]; the available number of i14_3 is Numi14_3=4, and values in the range of [0, (Numi14_3-1)]; and the available number of i2 is Numi2=2, and values in the range of [0,1]. Within the value ranges of the 7 parameters, a value is selected respectively and randomly as a search initial value for each of the 7 PMI parameters, and respectively recorded as: $i11_{rand}$, $i12_{rand}$, $i13_{rand}$, $i14\_1_{rand}$, $i14\_2_{rand}$, $i14\_3_{rand}$ and $i2_{rand}$. These initial values form basic parameters for the subsequent search steps.

For a PMI parameter not having any search result before the current search step, a random initial value is used in the current search step.

Then, the PMI parameters for each capacity calculation is generated based on the generated PMI parameter initial values, i.e., the first initial values of the PMI parameter set, the initial values of the 7 parameters, i.e., $\{i11_{rand}, i12_{rand}, i13_{rand}, i14\_1_{rand}, i14\_2_{rand}, i14\_3_{rand}, i2_{rand}\}$ are used for the first calculation (the PMI parameters are arranged in the order of {first PMI1 i11, first PMI2 i12, first PMI3 i13, first PMI4_1 i14_1, first $PMI4\_2_{rand}$, i14_2, first PMI4_3 i14_3, second PMI i2}, which is the same as below), PMI parameters $\{(i11_{rand}+N-1)\mod(Numi11), (i12_{rand}+N-1)\mod(Numi12), i13_{rand}, i14\_1_{rand}, i14\_2_{rand}, i14\_3_{rand}, i2_{rand}\}$ are used for the $N^{th}$ calculation, so on and so forth, until PMI parameters $\{(i11_{rand}+Numi12-1)\mod(Numi11), (i12_{rand}+Numi12-1)\mod(Numi12), i13_{rand}, i14\_1_{rand}, i14\_2_{rand}, i14\_3_{rand}, i2_{rand}\}$ are used for the last, i.e., the $Numi12^{th}$, calculation. A corresponding precoding matrix WN is generated according to the related configuration parameters and the $N^{th}$ input PMI parameters (for the codebook generation method, please refer to the related protocol of MP codebook in section 5.2.2.2.2 of 3GPP 38.214 V15.5.0), and then channel capacities and $Cap_N$ corresponding to respective subcarriers are calculated by combining the channel coefficient matrix $H_k$ and the noise variance matrix $\sigma_k^2 I_8$ obtained in step 300. The channel capacity and $Cap_N$ are calculated by:

$$Cap_N = \sum_k \log_2 \left| \frac{W_N^H H_N^H H_k W_N}{\frac{1}{N_{Rx}} \sum_i \sigma_{i,i}^2} + I_{RI \times RI} \right|,$$

where $N_{Rx}$ represents the number of receiving antennas, $I_{RI \times RI}$ represents a unit matrix with a size of RI×RI.

Next, the maximum value of all calculated Numi12 channel capacities is selected, and the first PMI2 parameter, denoted as $i12_{save}$, used for the maximum capacity is recorded.

At step 302, perform pre-search of first PMI4, and record the first PMI4 corresponding to the maximum capacity.

A PMI parameter set required for each capacity calculation is generated, and the corresponding channel capacities are calculated according to the channel and noise coefficients obtained in step 300 and the PMI parameter set, and compared to select the PMI parameter corresponding to the maximum capacity. In this embodiment, 3 rounds of first PMI4 pre-searching are adopted. The implementation process is described below.

First, according to the current RI, antenna configuration, codebook configuration and the PMI parameters output from step 301, initial values corresponding to the first PMI1 (i.e., i11), the first PMI2 (i.e., i12), the first PMI3 (i.e., i13), the first PMI4_1 (i.e., i14_1), the first PMI4_2 (i.e., i14_2), the first PMI4_3 (i.e., i14_3), and the second PMI (i.e., i2) in this step are generated. The initial value of i11 is $i11_{rand}$, the initial value of i12 is $i12_{save}$, the initial value of i13 is $i13_{rand}$, the initial value of i14_1 is $i14\_1_{rand}$, the initial value of i14_2 is $i14\_2_{rand}$, the initial value of i14_3 is $i14\_3_{rand}$, and the initial value of i2 is $i2_{rand}$.

Then, the PMI parameters for each capacity calculation is generated based on the PMI parameter initial values generated in this step. This embodiment needs to output 3 rounds of parameter sets in total. In this embodiment, assuming that when Ng=4, a pattern combination of the first PMI4 pre-searching is as shown in Table 1, then the first round uses a fixed initial i14 spacing pattern {0, 0, 0} in group 1, so the first calculation uses initial values of PMI parameter set $\{i11_{rand}, i12_{save}, i13_{rand}, i14\_1_{rand}+0, i14\_2_{rand}+0, i14\_3_{rand}+0, i2_{rand}\}$, the $N^{th}$ calculation uses PMI parameter set $\{i11_{rand}, i12_{save}, i13_{rand}, (i14\_1_{rand}+N-1+0)\mod(Numi14\_1), (i14\_2_{rand}+N-1+0)\mod(Numi14\_2), (i14\_3_{rand}+N-1+0)\mod(Numi14\_3), i2_{rand}\}$, so on and so forth, until the fourth calculation in the first round. Assuming that in this embodiment, the second round uses a random initial i14 spacing pattern in group 2, and randomly selects a group of patterns from the random initial pattern set shown in Table 1, such as {0,1,2}, so the first calculation uses initial values of PMI parameter set $\{i11_{rand}, i12_{save}, i13_{rand}, i14\_1_{rand}+0, i14\_2_{rand}+1, i14\_3_{rand}+2, i2_{rand}\}$, the $N^{th}$ calculation uses PMI parameter set $\{i11_{rand}, i12_{save}, i13_{rand}, (i14\_1_{rand}+N-1+0)\mod(Numi14\_1), (i14\_2_{rand}+N-1+1)\mod(Numi14\_2), (i14\_3_{rand}+N-1+2)\mod(Numi14\_3), i2_{rand}\}$, so on and so forth, until the fourth calculation in the second round. Assuming that in this embodiment, the third round uses a random initial i14 spacing pattern in group 3, and randomly selects a group of patterns from the random initial pattern set shown in Table 1, such as {0,2,3}, so the first calculation uses initial values $\{i11_{rand}, i12_{save}, i13_{rand}, i14\_1_{rand}+0, i14\_2_{rand}+2, i14\_3_{rand}+3, i2_{rand}\}$, the $N^{th}$ calculation uses PMI parameters $\{i11_{rand}, i12_{save}, i13_{rand}, (i14\_1_{rand}N-1+0)\mod(Numi14\_1), (i14\_2_{rand}+N-1+2)\mod(Numi14\_2), (i14\_3_{rand}+N-1+3)\mod(Numi14\_3), i2_{rand}\}$, so on and so forth, until the fourth calculation in the third round.

In this manner, a corresponding precoding matrix WN is generated according to the related configuration parameters and the $N^{th}$ input PMI parameters, and then channel capacities and $Cap_N$ corresponding to respective subcarriers are calculated by combining the channel coefficient matrix $H_k$ and the noise variance matrix $\sigma_k^2 I_8$ obtained in step 300.

TABLE 1

| Group No. | Pattern No. | Pattern |
|---|---|---|
| 1 | 1 | {0, 0, 0} |
| 2 | 1 | {0, 1, 0} |
|   | 2 | {0, 1, 1} |
|   | 3 | {0, 1, 2} |
|   | 4 | {0, 1, 3} |
| 3 | 1 | {0, 2, 0} |
|   | 2 | {0, 2, 1} |
|   | 3 | {0, 2, 2} |
|   | 4 | {0, 2, 3} |
| 4 | 1 | {0, 3, 0} |
|   | 2 | {0, 3, 1} |
|   | 3 | {0, 3, 2} |
|   | 4 | {0, 3, 3} |

Next, the maximum value of 3×4 calculated channel capacities is selected, and the first PMI4 parameters, denoted as $i14\_1_{save}$, $i14\_2_{save}$ and $i14\_3_{save}$ used for the maximum capacity are recorded.

When Ng=2, since there is only one i14_1 parameter, the 4 possible parameters may be directly traversed to perform the pre-searching, instead of performing multi-pattern search, which is not repeated here.

At step 303, perform search of first PMI1, and record the first PMI1 corresponding to the maximum capacity.

A PMI parameter set required for each capacity calculation is generated, and the corresponding channel capacities are calculated according to the channel and noise coefficients obtained in step 300 and the PMI parameter set, and compared to select the PMI parameter corresponding to the maximum capacity. The implementation process is described below.

First, according to the current RI, antenna configuration, codebook configuration and the PMI parameters after step 302, initial values corresponding to the first PMI1 (i.e., i11), the first PMI2 (i.e., i12), the first PMI3 (i.e., i13), the first PMI4_1 (i.e., i14_1), the first PMI4_2 (i.e., i14_2), the first PMI4_3 (i.e., i14_3), and the second PMI (i.e., i2) in this step are generated. The initial value of i11 is 0, the initial value of i12 is $i12_{save}$, the initial value of i13 is $i13_{rand}$, the initial value of i14_1 is $i14\_1_{save}$, the initial value of i14_2 is $i14\_2_{save}$, the initial value of i14_3 is $i14\_3_{save}$, and the initial value of i2 is $i2_{rand}$.

Then, the PMI parameters for each capacity calculation is generated based on the generated initial values of the PMI parameter set. The first calculation uses initial values of PMI parameter set $\{0, i12_{save}, i13_{rand}, i14\_1_{save}, i14\_2_{save}, i14\_3_{save}, i2_{rand}\}$, the $N^{th}$ calculation uses PMI parameter set $\{N-1, i12_{save}, i13_{rand}, i14\_1_{save}, i14\_2_{save}, i14\_3_{save}, i2_{rand}\}$, so on and so forth, until the last, i.e., the $Numi11^{th}$ calculation uses the PMI parameter set (Numi11-1, $i12_{save}$, $i13_{rand}$, $i14\_1_{save}$, $i14\_2_{save}$, $i14\_3_{save}$, $i2_{rand}\}$. In this manner, a corresponding precoding matrix WN is generated according to the related configuration parameters and the $N^{th}$ input PMI parameters and then channel capacities and $Cap_N$ corresponding to respective subcarriers are calculated by combining the channel coefficient matrix $H_k$ and the noise variance matrix $\sigma_k^2 I_8$.

Next, the maximum value of the Numi11 calculated channel capacities is selected, and the first PMI1 parameter, denoted as $i11_{report}$, used for the maximum capacity is recorded.

At step 304, perform search of first PMI2, and record the first PMI2 corresponding to the maximum capacity.

A PMI parameter set required for each capacity calculation is generated, and the corresponding channel capacities are calculated according to the channel and noise coefficients obtained in step 300 and the PMI parameter set, and compared to select the PMI parameter corresponding to the maximum capacity as the finally selected PMI. The implementation process is described below.

First, according to the current RI, antenna configuration, codebook configuration and the PMI parameters output from step 303, initial values corresponding to the first PMI1 (i.e., i11), the first PMI2 (i.e., i12), the first PMI3 (i.e., i13), the first PMI4_1 (i.e., i14_1), the first PMI4_2 (i.e., i14_2), the first PMI4_3 (i.e., i14_3), and the second PMI (i.e., i2) in this step are generated. The initial value of i11 is $i11_{report}$, the initial value of i12 is 0, the initial value of i13 is $i13_{rand}$, the initial value of i14_1 is $i14\_1_{save}$, the initial value of i14_2 is $i14\_2_{save}$, the initial value of i14_3 is $i14\_3_{save}$, and the initial value of i2 is $i2_{rand}$.

Then, the PMI parameters for each capacity calculation is generated based on the generated initial values of the PMI parameter set. The first calculation uses initial values of PMI parameter set $\{i11_{report}, 0, i13_{rand}, i14\_1_{save}, i14\_2_{save}, i14\_3_{save}, i2_{rand}\}$, the $N^{th}$ calculation uses PMI parameter set $\{i11_{report}, N-1, i13_{rand}, i14\_1_{save}, i14\_2_{save}, i14\_3_{save}, i2_{rand}\}$, so on and so forth, until the last, i.e., the $Numi12^{th}$ calculation uses the PMI parameter set $\{i11_{report}, Numi12-1, i13_{rand}, i14\_1_{save}, i14\_2_{save}, i14\_3_{save}, i2_{rand}\}$. In this manner, a corresponding precoding matrix WN is generated according to the related configuration parameters and the $N^{th}$ input PMI parameters, and then channel capacities and $Cap_N$ corresponding to respective subcarriers are calculated by combining the channel coefficient matrix $H_k$ and the noise variance matrix $\sigma_k^2 I_8$.

Next, the maximum value of the Numi12 calculated channel capacities is selected, and the first PMI2 parameter, denoted as $i12_{report}$, used for the maximum capacity is recorded.

At step 305, perform search of first PMI4, and record the first PMI4 corresponding to the maximum capacity.

A PMI parameter set required for each capacity calculation is generated, and the corresponding channel capacities are calculated according to the channel and noise coefficients obtained in step 300 and the PMI parameter set, and compared to select the PMI parameter corresponding to the maximum capacity as the finally selected PMI. The implementation process is described below.

First, according to the current RI, antenna configuration, codebook configuration and the PMI parameters output from step 304, initial values corresponding to the first PMI1 (i.e., i11), the first PMI2 (i.e., i12), the first PMI3 (i.e., i13), the first PMI4_1 (i.e., i14_1), the first PMI4_2 (i.e., i14_2), the first PMI4_3 (i.e., i14_3), and the second PMI (i.e., i2) in each round of this step are generated. In the first round of calculation, the initial value of i11 is $i11_{report}$, the initial value of i12 is $i12_{report}$, the initial value of i13 is $i13_{rand}$, the initial value of i14_1 is 0, the initial value of i14_2 is $i14\_2_{save}$, the initial value of i14_3 is $i14\_3_{save}$, and the initial value of i2 is $i2_{rand}$. In the second round of calculation, the initial value of i11 is $i11_{report}$, the initial value of i12 is $i12_{report}$, the initial value of i13 is $i13_{rand}$, the initial value of i14_1 is $i14\_1_{save}$, the initial value of i14_2 is 0, the initial value of i14_3 is $i14\_3_{save}$, and the initial value of i2 is $i2_{rand}$. In the third round of calculation, the initial value of i11 is $i11_{report}$, the initial value of i12 is $i12_{report}$, the initial value of i13 is $i13_{rand}$, the initial value of i14_1 is $i14\_1_{save}$, the initial value of i14_2 is i14_2$_{save}$, the initial value of i14_3 is 0, and the initial value of i2 is i2$_{rand}$.

For the first round of calculation, the PMI parameters for each capacity calculation are generated, and the first calculation uses initial values of PMI parameter set {i11$_{report}$, i12$_{report}$, i13$_{rand}$, 0, i14_2$_{save}$, i14_3$_{save}$, i2$_{rand}$}, the N$^{th}$ calculation uses PMI parameter set {i11$_{report}$, i12$_{report}$, i13$_{rand}$, N−1, i14_2$_{save}$, i14_3$_{save}$, i2$_{rand}$}, so on and so forth, until the last, i.e., the Numi14_1$^{th}$ calculation. In this manner, a corresponding precoding matrix WN is generated according to the related configuration parameters and the N$^{th}$ input PMI parameters, and then channel capacities and Cap$_N$ corresponding to respective subcarriers are calculated by combining the channel coefficient matrix H$_k$ and the noise variance matrix σ$_k^2$I$_8$.

Then, the maximum value of the Numi14_1 calculated channel capacities is selected, and the first PMI4_1 parameter, denoted as i14_1$_{report}$, used for the maximum capacity is recorded.

For the second round of calculation, the PMI parameters for each capacity calculation are generated, and the first calculation uses initial values of PMI parameter set {i11$_{report}$, i12$_{report}$, i13$_{rand}$, i14_1$_{report}$, 0, i14_3$_{save}$, i2$_{rand}$}, the N$^{th}$ calculation uses PMI parameter set {i11$_{report}$, i12$_{report}$, i13$_{rand}$, i14_1$_{report}$, N−1, i14_3$_{save}$, i2$_{rand}$}, so on and so forth, until the last, i.e., the Numi14_2$^{th}$ calculation. In this manner, a corresponding precoding matrix WN is generated according to the related configuration parameters and the N$^{th}$ input PMI parameters, and then channel capacities and Cap$_N$ corresponding to respective subcarriers are calculated by combining the channel coefficient matrix H$_k$ and the noise variance matrix σ$_k^2$I$_8$.

Then, the maximum value of the Numi14_2 calculated channel capacities is selected, and the first PMI4_2 parameter, denoted as i14_2$_{report}$, used for the maximum capacity is recorded.

For the third round of calculation, the PMI parameters for each capacity calculation are generated, and the first calculation uses initial values of PMI parameter set {i11$_{report}$, i12$_{report}$, i13$_{rand}$, i14_1$_{report}$, i14_2$_{report}$, 0, i2$_{rand}$}, the N$^{th}$ calculation uses PMI parameter set {i11$_{report}$, i12$_{report}$, i13$_{rand}$, i14_1$_{report}$, i14_2$_{report}$, N−1, i2$_{rand}$}, so on and so forth, until the last, i.e., the Numi14_3$^{th}$ calculation. In this manner, a corresponding precoding matrix WN is generated according to the related configuration parameters and the N$^{th}$ input PMI parameters, and then channel capacities and Cap$_N$ corresponding to respective subcarriers are calculated by combining the channel coefficient matrix H$_k$ and the noise variance matrix σ$_k^2$I$_8$.

Then, the maximum value of the Numi14_3 calculated channel capacities is selected, and the first PMI4_3 parameter, denoted as i14_3$_{report}$, used for the maximum capacity is recorded, which is then output along with i11$_{report}$, i12$_{report}$, i14_1$_{report}$, i14_2$_{report}$.

At step 306, perform search of first PMI3-second PMI, and record the first PMI3-second PMI corresponding to the maximum capacity.

A PMI parameter set required for each capacity calculation is generated, and the corresponding channel capacities are calculated according to the channel and noise coefficients obtained in step 300 and the PMI parameter set, and compared to select the PMI parameter corresponding to the maximum capacity as the finally selected PMI. The implementation process is described below.

First, according to the current RI, antenna configuration, codebook configuration and the PMI parameters output from step 305, initial values corresponding to the first PMI1 (i.e., i11), the first PMI2 (i.e., i12), the first PMI3 (i.e., i13), the first PMI4_1 (i.e., i14_1), the first PMI4_2 (i.e., i14_2), the first PMI4_3 (i.e., i14_3), and the second PMI (i.e., i2) in this step are generated. The initial value of i11 is i11$_{report}$, the initial value of i12 is i12$_{report}$, the initial value of i13 is 0, the initial value of i14_1 is i14_1$_{report}$, the initial value of i14_2 is i14_2$_{report}$, the initial value of i14_3 is i14_3$_{report}$, and the initial value of i2 is 0.

Then, the PMI parameters for each capacity calculation is generated based on the generated initial values of the PMI parameter set. The first calculation uses initial values of PMI parameter set {i11$_{report}$, i12$_{report}$, 0, i14_1$_{report}$, i14_2$_{report}$, i14_3$_{report}$, 0}, the N$^{th}$ calculation uses PMI parameters {i11$_{report}$, i12$_{report}$, floor((N−1)/Numi2), i14_1$_{report}$, i4_2$_{report}$, i14_3$_{report}$, (N−1)mod(Numi2)}, so on and so forth, until the last, i.e., the Numi13×Numi2$^{th}$ calculation uses the PMI parameters {i11$_{report}$, i12$_{report}$, Numi13−1, i4_1$_{report}$, i4_2$_{report}$, i14_3$_{report}$, Numi2−1}. In this manner, a corresponding precoding matrix WN is generated according to the related configuration parameters and the N$^{th}$ input PMI parameters, and then channel capacities and Cap$_N$ corresponding to respective subcarriers are calculated by combining the channel coefficient matrix H$_k$ and the noise variance matrix σ$_k^2$I$_8$.

Next, the maximum value of the Numi13×Numi2 calculated channel capacities is selected, and the first PMI3 and second PMI parameters, denoted as i13$_{report}$ and i2$_{report}$ respectively, used for the maximum capacity are recorded.

Finally, the search of all PMIs is completed, and the PMI parameter set values finally reported are: i11$_{report}$, i12$_{report}$, i13$_{report}$, i14_1$_{report}$, i14_2$_{report}$, i14_3$_{report}$ and i2$_{report}$.

It should be noted that since the first PMI3 parameter does not need to be reported when RI=1, search of first PMI3 is not necessary at this time.

As can be seen from this embodiment, a layer 2 multilevel separated searching process is completed through six times of search to select the PMI, which only requires Numi12+(Numi14_1+Numi14_2+Numi14_3)+Numi11+Numi12+(Numi14_1+Numi14_2+Numi14_3)+Numi13×Numi2=8+12+8+8+12+8=56 times of search, whereas the traversal search method in the related art requires 32768 times of search, and the complexity of the method provided in this application is only 0.2% of the traversal search method in the related art.

According to the implementation for acquiring the PMI of the present application, better i12 parameters are selected by carrying out one-time pre-search, avoiding the search performance loss caused by an over-poor initial broadband beam during further search; and then, multi-pattern i14 parameter pre-search with a configurable number of rounds is carried out, avoiding the search performance loss caused by an over-poor initial broadband phase during further search and thus ensuring the search performance. Meanwhile, for a layer 1/3/4 codebook with similar structures to that of a layer 2 MP codebook, this embodiment, on the premise of ensuring the performance, reduces the times of search to be within 0.3% of the traversal search method in the related art, and thus realizes selection of the PMI in a simple and effective manner.

In the embodiment shown in FIG. 3, the pre-search processes in steps 301 and 302 is mainly added to ensure the PMI search performance, and may also be omitted. Instead, random initial values may be directly used in the search and calculation of steps 303 to 306 to obtain the PMI reported values. In this case, after step 300 is executed, selection of the random initial values of the PMI parameter set in step 301 is performed, and then the random initial values of multiple PMI parameters are directly used in the calculation of steps 303 to 306. Omitting the pre-search process may further reduce the calculation complexity.

The multilevel separated PMI further search provided in the present application reduces the calculation complexity, and has comparable performance with, but lower calculation complexity with, searching any number of PMI parameters together.

Figure 4:
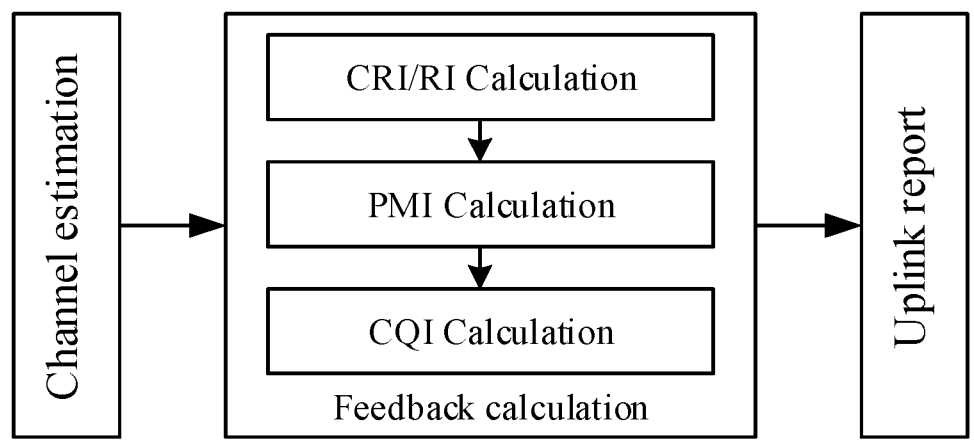
FIG. 4 is a schematic diagram of an application scenario for acquiring a PMI according to the present application.

FIG. 4 is a schematic diagram of an application scenario for acquiring a PMI according to the present application. As shown in FIG. 4, the apparatus for obtaining a PMI according to the present application is a PMI calculation part in FIG. 4.

What is claimed:

1. A method for acquiring a precoding matrix index (PMI), comprising:
  searching a first group of PMI parameters according to first initial values of a PMI parameter set, and determining the first group of PMI parameters corresponding to the maximum capacity as a first group of reported values;
  generating second initial values of the PMI parameter set according to the first group of reported values and the first initial values of the PMI parameter set;
  searching a second group of PMI parameters according to the second initial values of the PMI parameter set, and determining the second group of PMI parameters corresponding to the maximum capacity as a second group of reported values;
  generating third initial values of the PMI parameter set according to the second group of reported values and the second initial values of the PMI parameter set; and
  searching a third group of PMI parameters according to the third initial values of the PMI parameter set, and determining the third group of PMI parameters corresponding to the maximum capacity as a third group of reported values,
  wherein before the step of searching the first group of PMI parameters according to the first initial values of the PMI parameter set, the method further comprises:
  generating the first initial values of the PMI parameter set according to current configuration parameters,
  wherein the configuration parameters comprise: rank indicator (RI), antenna configuration and codebook configuration,
  wherein the first initial values of the PMI parameter set comprise initial values of the following: a first wideband precoding indication first PMI1, a second wideband precoding indication first PMI2, a third wideband precoding indication first PMI3, a second antenna panel fourth wideband precoding indication first PMI4_1, a third antenna panel fourth wideband precoding indication first PMI4_2, a fourth antenna panel fourth wideband precoding indication first PMI4_3, and a subband precoding indication second PMI, which are respectively denoted as: $i11_{rand}$, $i12_{rand}$, $i13_{rand}$, $i14\_1_{rand}$, $i14\_2_{rand}$, $i14\_3_{rand}$ and $i2_{rand}$,
  wherein before the step of searching the first group of PMI parameters according to the first initial values of the PMI parameter set, the method further comprises:
  estimating a channel coefficient matrix and a noise variance matrix on each subcarrier according to pilot signals,
  wherein after the step of generating the first initial values of the PMI parameter set and before the step of searching the first group of PMI parameters according to the first initial values of the PMI parameter set, the method further comprises:
  generating a first PMI2 preset for pre-searching the first PMI2 according to the first initial values of the PMI parameter set;
  calculating, according to the estimated channel coefficient matrix and noise variance matrix and the first PMI2 preset, channel capacities corresponding to respective PMI values in the first PMI2 preset;
  selecting the first PMI2 corresponding to the maximum capacity and recording a value $i12_{save}$ of the first PMI2 corresponding to the maximum capacity; and
  updating the first initial values of the PMI parameter set according to the recorded $i12_{save}$,
  wherein after pre-searching the first PMI2 and before the step of searching the first group of PMI parameters according to the first initial values of the PMI parameter set, the method further comprises:
  generating a first PMI4 preset for pre-searching a fourth wideband precoding indication first PMI4 according to the first initial values of the PMI parameter set;
  calculating, according to the estimated channel coefficient matrix and noise variance matrix and the first PMI4 preset, channel capacities corresponding to respective PMI values in the first PMI4 preset;
  selecting the first PMI4 corresponding to the maximum capacity and recording a value of the first PMI4 corresponding to the maximum capacity; and
  updating the first initial values of the PMI parameter set according to the recorded value of the first PMI4 corresponding to the maximum capacity;
  wherein the first PMI4 parameter comprises first PMI4_1, first PMI4_2 and first PMI4_3,
  the step of generating the first PMI4 preset for pre-searching the first PMI4 comprises:
  generating a first PMI4 preset with preset search rounds according to the first initial values of the PMI parameter set:
  the first round uses a fixed initial i14 spacing pattern {a', b', c'} in a first group of patterns, the first calculation in the first round uses initial values comprising $\{i11_{rand}, i12_{save}, i13_{rand}, i14\_1_{rand}+a', i14\_2_{rand}+b', i14\_3_{rand}+c', i2_{rand}\}$, the $N^{th}$ calculation in the first round uses PMI parameters comprising $\{i11_{rand}, i12_{save}, i13_{rand}, (i14\_1_{rand}+N-1+a')\bmod(Numi14\_1), (i14\_2_{rand}+N-1+b')\bmod(Numi14\_2), (i14\_3_{rand}+N-1+c')\bmod(Numi14\_3), i2_{rand}\}$, until the fourth calculation in the first round;
  the second round uses a random initial i14 spacing pattern {a", b", c"} in a second group of patterns, the first calculation in the second round uses initial values comprising $\{i11_{rand}, i12_{save}, i13_{rand}, i14\_1_{rand}+a'', i14\_2_{rand}+b'', i14\_3_{rand}+c'', i2_{rand}\}$, the $N^{th}$ calculation in the second round uses PMI parameters comprising $\{i11_{rand}, i12_{save}, i13_{rand}, (i14\_1_{rand}+N-1+a'')\bmod(Numi14\_1), (i14\_2_{rand}+N-1+b'')\bmod(Numi14\_2), (i14\_3_{rand}+N-1+c'')\bmod(Numi14\_3), i2_{rand}\}$, until the fourth calculation in the second round; and
  the preset search round uses a random initial i14 spacing pattern {a''', b''', c'''} in a third group of patterns, the first calculation in the preset search round uses initial values comprising $\{i11_{rand}, i12_{save}, i13_{rand}, i14\_1_{rand}+a''', i14\_2_{rand}+b''', i14\_3_{rand}+c''', i2_{rand}\}$, the $N^{th}$ calculation in the preset search round uses PMI parameters comprising $\{i11_{rand}, i12_{save}, i13_{rand}, (i14\_1_{rand}+N-1+a''')\bmod(Numi14\_1), (i14\_2_{rand}+N-1+b''')\bmod (Numi14_2), (i14_3$_{rand}$+N−1+c''')mod(Numi14_3), i2$_{rand}$}, until the fourth calculation in the preset search round.

2. The method according to claim 1, wherein the first group of PMI parameters comprises the first PMI1 and the first PMI2,
the step of searching the first group of PMI parameters according to the first initial values of the PMI parameter set, and determining the first group of PMI parameters corresponding to the maximum capacity as the first group of reported values comprises:
generating a first PMI1 set for searching the first PMI1 according to the first initial values of the PMI parameter set, wherein the first PMI1 set comprises: [0~(Numi11-1)], i12$_{rand}$, i13$_{rand}$, i14_1$_{rand}$, i14_2$_{rand}$, i14_3$_{rand}$ and i2$_{rand}$, where Numi11 is the available number of i11, and [0~(Numi11-1)] represents all values from 0 to Numi11-1;
calculating, according to the estimated channel coefficient matrix and noise variance matrix and the first PMI1 set, first channel capacities corresponding to respective PMI values in the first PMI1 set;
selecting the first PMI1 corresponding to the maximum first channel capacity from the calculated first channel capacities, and recording a reported value i11$_{report}$ of the first PMI1 corresponding to the maximum first channel capacity;
updating the first initial values of the PMI parameter set according to the recorded i11$_{report}$, and generating a first PMI2 set for searching the first PMI2, wherein the first PMI2 set comprises: i11$_{report}$, [0~(Numi12-1)], i13$_{rand}$, i14_1$_{rand}$, i14_2$_{rand}$, i14_3$_{rand}$ and i2$_{rand}$, where Numi12 is the available number of i12, and [0~(Numi12-1)] represents all values from 0 to Numi12-1;
calculating, according to the estimated channel coefficient matrix and noise variance matrix and the first PMI2 set, second channel capacities corresponding to respective PMI values in the first PMI2 set;
selecting the first PMI2 corresponding to the maximum second channel capacity from the calculated second channel capacities, and recording a reported value i12$_{report}$ of the first PMI2 corresponding to the maximum second channel capacity; and
taking the recorded i11$_{report}$ and i12$_{report}$ as the first group of reported values.

3. The method according to claim 2, wherein the step of generating the second initial values of the PMI parameter set comprise:
replacing corresponding PMI parameters in the first initial values of the PMI parameter set with the first group of PMI parameters to obtain the second initial values of the PMI parameter set, wherein the second initial values of the PMI parameter set comprise: i11$_{report}$, i12$_{report}$, i13$_{rand}$, i14_1$_{rand}$, i14_2$_{rand}$, i14_3$_{rand}$ and i2$_{rand}$.

4. The method according to claim 3, wherein the second group of PMI parameters comprises: first PMI4_x, first PMI4_y and first PMI4_z, where x, y and z are any combination of 1, 2 and 3, and
the step of searching the second group of PMI parameters according to the second initial values of the PMI parameter set, and determining the second group of PMI parameters corresponding to the maximum capacity as the second group of reported values comprises:
generating a first PMI4_x set for searching the first PMI4_x according to the second initial values of the PMI parameter set; calculating, according to the estimated channel coefficient matrix and noise variance matrix and the first PMI4_x set, sixth channel capacities corresponding to respective PMI values in the first PMI4_x set; selecting the first PMI4_x corresponding to the maximum sixth channel capacity from the calculated sixth channel capacities, and recording a reported value i14_x$_{report}$ of the first PMI4_x corresponding to the maximum sixth channel capacity;
generating a first PMI4_y set for searching the first PMI4_y according to the second initial values of the PMI parameter set and the reported value of the first PMI4_x; calculating, according to the estimated channel coefficient matrix and noise variance matrix and the first PMI4_y set, seventh channel capacities corresponding to respective PMI values in the first PMI4_y set; selecting the first PMI4_y corresponding to the maximum seventh channel capacity from the calculated seventh channel capacities, and recording a reported value i14_y$_{report}$ of the first PMI4_y corresponding to the maximum seventh channel capacity;
generating a first PMI4_z set for searching the first PMI4_z according to the second initial values of the PMI parameter set, the reported value of the first PMI4_x and the reported value of the first PMI4_y; calculating, according to the estimated channel coefficient matrix and noise variance matrix and the first PMI4_z set, eighth channel capacities corresponding to respective PMI values in the first PMI4_z set; selecting the first PMI4_z corresponding to the maximum eighth channel capacity from the calculated eighth channel capacities, and recording a reported value i14_z$_{report}$ of the first PMI4_z corresponding to the maximum eighth channel capacity; and
taking the recorded i14_x$_{report}$, i14_y$_{report}$ and i14_z$_{report}$ as the second group of reported values.

5. The method according to claim 4, wherein the step of generating the third initial values of the PMI parameter set comprise:
replacing corresponding PMI parameters in the second initial values of the PMI parameter set with the second group of PMI parameters to obtain the third initial values of the PMI parameter set, wherein the third initial values of the PMI parameter set comprise: i11$_{report}$, i12$_{report}$, i13$_{rand}$, i14_1$_{report}$, i14_2$_{report}$, i14_3$_{report}$ and i2$_{rand}$.

6. The method according to claim 5, wherein the third group of PMI parameters comprises first PMI3 and second PMI,
the step of searching the third group of PMI parameters according to the third initial values of the PMI parameter set, and determining the third group of PMI parameters corresponding to the maximum capacity as the third group of reported values comprises:
generating a first PMI3-second PMI set for searching the first PMI3 and the second PMI according to the third initial values of the PMI parameter set, wherein the first PMI3-second PMI set comprises: i11$_{report}$, i12$_{report}$, [0~(Numi13-1)], i14_1$_{report}$, i14_2$_{report}$, i14_3$_{report}$ and [0~(Numi2-1)], where Numi13 is the available number of i13, and [0~(Numi13-1)] represents all values from 0 to Numi13-1; Numi2 is the available number of i2, and [0~(Numi2-1)] represents all values from 0 to Numi2-1;
calculating, according to the estimated channel coefficient matrix and noise variance matrix and the first PMI3- second PMI set, ninth channel capacities corresponding to respective PMI values in the first PMI3-second PMI set;

selecting the first PMI3 and second PMI corresponding to the maximum ninth channel capacity from the calculated ninth channel capacities, and recording a reported value $i13_{report}$ of the first PMI3 corresponding to the maximum ninth channel capacity and a reported value $i2_{report}$ of the second PMI corresponding to the maximum ninth channel capacity; and taking the recorded $i13_{report}$ and $i2_{report}$ as the third group of reported values.

7. The method according to claim 3, wherein the second group of PMI parameters comprises first PMI4_1, and the step of searching the second group of PMI parameters according to the second initial values of the PMI parameter set, and determining the second group of PMI parameters corresponding to the maximum capacity as the second group of reported values comprises:

generating a first PMI4_1 set for searching the first PMI4_1 according to the second initial values of the PMI parameter set, wherein the first PMI4_1 set comprises: $i11_{report}$, $i12_{report}$, $i13_{rand}$, [0~(Numi14_1-1)] and $i2_{rand}$, where Numi14_1 is the available number of i14_1, and [0~(Numi14_1-1)] represents all values from 0 to Numi14_1-1;

calculating, according to the estimated channel coefficient matrix and noise variance matrix and the first PMI4_1 set, fifth channel capacities corresponding to respective PMI values in the first PMI4_1 set;

selecting the first PMI4_1 corresponding to the maximum fifth channel capacity from the calculated fifth channel capacities, and recording a reported value $i14\_1_{report}$ of the first PMI4_1 corresponding to the maximum fifth channel capacity; and taking the recorded $i14\_1_{report}$ as the second group of reported values.

8. The method according to claim 1, wherein the first group of PMI parameters comprises the first PMI1 and the first PMI2, the step of searching the first group of PMI parameters according to the first initial values of the PMI parameter set, and determining the first group of PMI parameters corresponding to the maximum capacity as the first group of reported values comprises:

generating a first PMI2 set for searching the first PMI2 according to the first initial values of the PMI parameter set, wherein the first PMI2 set comprises: $i11_{rand}$, [0~(Numi12-1)], $i13_{rand}$, $i14\_1_{rand}$, $i14\_2_{rand}$, $i14\_3_{rand}$ and $i2_{rand}$, where Numi12 is the available number of i12, and [0~(Numi12-1)] represents all values from 0 to Numi12-1;

calculating, according to the estimated channel coefficient matrix and noise variance matrix and the first PMI2 set, third channel capacities corresponding to respective PMI values in the first PMI2 set;

selecting the first PMI2 corresponding to the maximum third channel capacity from the calculated third channel capacities, and recording a reported value $i12_{report}$ of the first PMI2 corresponding to the maximum third channel capacity;

updating the first initial values of the PMI parameter set according to the recorded $i12_{report}$, and generating a first PMI1 set for searching the first PMI1, wherein the first PMI1 set comprises: [0~(Numi11-1)], $i12_{report}$, $i13_{rand}$, $i14\_1_{rand}$, $i14\_2_{rand}$, $i14\_3_{rand}$ and $i2_{report}$, where Numi11 is the available number of i11, and [0~(Numi11-1)] represents all values from 0 to Numi11-1;

calculating, according to the estimated channel coefficient matrix and noise variance matrix and the first PMI1 set, fourth channel capacities corresponding to respective PMI values in the first PMI1 set;

selecting the first PMI1 corresponding to the maximum fourth channel capacity from the calculated fourth channel capacities, and recording a reported value $i11_{report}$ of the first PMI1 corresponding to the maximum fourth channel capacity; and taking the recorded $i1_{report}$ and $i11_{report}$ as the first group of reported values.

9. The method according to claim 1, wherein the step of generating the first PMI2 preset for pre-searching the first PMI2 comprises:

using initial values of PMI parameters comprising $\{i11_{rand}, i12_{rand}, i13_{rand}, i14\_1_{rand}, i14\_2_{rand}, i14\_3_{rand}, i2_{rand}\}$ for the first calculation, using PMI parameters comprising $\{(i11_{rand}+N-1)\bmod(Numi11), (i12_{rand}+N-1)\bmod(Numi12), i13_{rand}, i14\_1_{rand}, i14\_2_{rand}, i14\_3_{rand}, i2_{rand}\}$ for the $N^{th}$ calculation, so on and so forth, until using PMI parameters comprising $\{(i11_{rand}+Numi12-1)\bmod(Numi11), (i12_{rand}+Numi12-1)\bmod(Numi12), i13_{rand}, i14\_1_{rand}, i14\_2_{rand}, i14\_3_{rand}, i2_{rand}\}$ for the $Numi12^{th}$ calculation.

10. The method according to claim 1, wherein the step of selecting the first PMI2 corresponding to the maximum capacity and recording the value $i12_{save}$ of the first PMI2 corresponding to the maximum capacity comprises:

selecting the maximum value of all calculated Numi12 channel capacities, and recording the first PMI2 parameter $i12_{save}$ used for calculating the maximum value, wherein after updating the first initial values of the PMI parameter set by pre-searching the first PMI2, the first initial values of the PMI parameter set are: $i11_{rand}$, $i12_{save}$, $i3_{rand}$, $i4\_1_{rand}$, $i14\_2_{rand}$, $i14\_3_{rand}$ and $i2_{rand}$.

11. The method according to claim 1, wherein the step of selecting the first PMI4 corresponding to the maximum capacity and recording the value of the first PMI4 corresponding to the maximum capacity comprises:

selecting the maximum value of the preset search round×4 calculated channel capacities, and recording the first PMI4 parameters $i14\_1_{save}$, $i14\_2_{save}$, $i14\_3_{save}$ used for calculating the maximum value, wherein after updating the first initial values of the PMI parameter set by pre-searching the first PMI4, the first initial values of the PMI parameter set are: $i11_{rand}$, $i12_{save}$, $i13_{rand}$, $i14\_1_{save}$, $i14\_2_{save}$, $i14\_3_{save}$ and $i2_{rand}$.

12. A computer-readable storage medium having computer-executable instructions stored thereon, wherein the computer-executable instructions are configured to cause the method for acquiring a precoding matrix index (PMI) according to claim 1 to be implemented.

13. An apparatus for acquiring a precoding matrix index (PMI), comprising a processor and a memory, wherein the memory has stored thereon a computer program operable on the processor to: cause steps of the method for acquiring a PMI according to claim 1 to be implemented.

14. An apparatus for acquiring a precoding matrix index (PMI), comprising: a processing unit, a first search control unit, a second search control unit, a third search control unit, a first pre-search control unit and a second pre-search control unit, wherein the first search control unit is configured to generate a first PMI1 set for searching a first wideband precoding indication first PMI1 according to first initial values of the PMI parameter set, and output the first PMI1 set to the processing unit;

the second search control unit is configured to generate second initial values of the PMI parameter set according to the determined first group of PMI parameters and the first initial values of the PMI parameter set, and output the second initial values of the PMI parameter set to the processing unit;

the third search control unit is configured to generate third initial values of the PMI parameter set according to the determined second group of PMI parameters and the second initial values of the PMI parameter set; and the processing unit is configured to: search the first group of PMI parameters according to the first initial values of the PMI parameter set, and determine the first group of PMI parameters corresponding to the maximum capacity as a first group of reported values; search the second group of PMI parameters according to the second initial values of the PMI parameter set, and determine the second group of PMI parameters corresponding to the maximum capacity as a second group of reported values; search a third group of PMI parameters according to the third initial values of the PMI parameter set, and determine the third group of PMI parameters corresponding to the maximum capacity as a third group of reported values;

wherein before the first search control unit generates the first PMI1 set for searching the first wideband precoding indication first PMI1 according to the first initial values of the PMI parameter set, the first initial values of the PMI parameter set are generated according to current configuration parameters, the configuration parameters comprise rank indicator (RI), antenna configuration and codebook configuration, wherein the first initial values of the PMI parameter set comprise initial values of the following: a first wideband precoding indication first PMI1, a second wideband precoding indication first PMI2, a third wideband precoding indication first PMI3, a second antenna panel fourth wideband precoding indication first PMI4_1, a third antenna panel fourth wideband precoding indication first PMI4_2, a fourth antenna panel fourth wideband precoding indication first PMI4_3, and a subband precoding indication second PMI, which are respectively denoted as: $i_{rand}$, $i12_{rand}$, $i13_{rand}$, $i14\_1_{rand}$, $i14\_2_{rand}$, $i14\_3_{rand}$ and $i2_{rand}$, wherein before the first search control unit generates the first PMI1 set for searching the first wideband precoding indication first PMI1 according to the first initial values of the PMI parameter set, a channel coefficient matrix and a noise variance matrix on each subcarrier are estimated according to pilot signals, the first pre-search control unit is configured to:

generate a first PMI2 preset for pre-searching a second wideband precoding indication first PMI2 according to the first initial values of the PMI parameter set; calculate, according to the estimated channel coefficient matrix and noise variance matrix and the first PMI2 preset, channel capacities corresponding to respective PMI values in the first PMI2 preset; select the first PMI2 corresponding to the maximum capacity and record a value $i12_{save}$ of the first PMI2 corresponding to the maximum capacity; and update the first initial values of the PMI parameter set according to the recorded $i12_{save}$; and the second pre-search control unit is configured to:

generate a first PMI4 preset for pre-searching a fourth wideband precoding indication first PMI4 according to the first initial values of the PMI parameter set; calculate, according to the estimated channel coefficient matrix and noise variance matrix and the first PMI4 preset, channel capacities corresponding to respective PMI values in the first PMI4 preset; select the first PMI4 corresponding to the maximum capacity and record a value of the first PMI4 corresponding to the maximum capacity; and update the first initial values of the PMI parameter set according to the recorded value of the first PMI4 corresponding to the maximum capacity;

wherein the first PMI4 parameter comprises first PMI4_1, first PMI4_2 and first PMI4_3, the second pre-search control unit is configured to generate a first PMI4 preset with preset search rounds according to the first initial values of the PMI parameter set to generate the first PMI4 preset for pre-searching the first PMI4:

the first round uses a fixed initial i14 spacing pattern {a', b', c'} in a first group of patterns, the first calculation in the first round uses initial values comprising {$i11_{rand}$, $i12_{save}$, $i13_{rand}$, $i14\_1_{rand}+a''$, $i14\_2_{rand}+b''$, $i14\_3_{rand}+c''$, $i2_{rand}$}, the $N^{th}$ calculation in the first round uses PMI parameters comprising {$i11_{rand}$, $i12_{save}$, $i13_{rand}$, $(i14\_1_{rand}+N-1+a')\bmod(Numi14\_1)$, $(i14\_2_{rand}+N-1+b')\bmod(Numi14\_2)$, $(i14\_3_{rand}+N-1+c')\bmod(Numi14\_3)$, $i2_{rand}$}, until the fourth calculation in the first round;

the second round uses a random initial i14 spacing pattern {a", b", c"} in a second group of patterns, the first calculation in the second round uses initial values comprising {$i11_{rand}$, $i12_{save}$, $i13_{rand}$, $i14\_1_{rand}+a''$, $i14\_2_{rand}+b''$, $i14\_3_{rand}+c''$, $i2_{rand}$}, the $N^{th}$ calculation in the second round uses PMI parameters comprising {$i11_{rand}$, $i12_{save}$, $i13_{rand}$, $(i14\_1_{rand}+N-1+a'')\bmod(Numi14\_1)$, $(i14\_2_{rand}+N-1+b'')\bmod(Numi14\_2)$, $(i14\_3_{rand}+N-1+c'')\bmod(Numi14\_3)$, $i2_{rand}$}, until the fourth calculation in the second round; and the preset search round uses a random initial i14 spacing pattern {a''', b''', c'''} in a third group of patterns, the first calculation in the preset search round uses initial values comprising {$i11_{rand}$, $i12_{save}$, $i13_{rand}$, $i14\_1_{rand}+a'''$, $i14\_2_{rand}+b'''$, $i14\_3_{rand}+c'''$, $i2_{rand}$}, the $N^{th}$ calculation in the preset search round uses PMI parameters comprising {$i14_{rand}$, $i12_{save}$, $i13_{rand}$, $(i14\_1_{rand}+N-1+a''')\bmod(Numi14\_1)$, $(i14\_2_{rand}+N-1+b''')\bmod(Numi14\_2)$, $(i14\_3_{rand}+N-1+c''')\bmod(Numi14\_3)$, $i2_{rand}$}, until the fourth calculation in the preset search round.

15. The apparatus according to claim 14, further comprising an estimation unit configured to estimate a channel coefficient matrix and a noise variance matrix on each subcarrier according to pilot signals.

* * * * *

UNITED STATES PATENT AND TRADEMARK OFFICE
CERTIFICATE OF CORRECTION

| | | |
|---|---|---|
| PATENT NO. | : 12,244,386 B2 | Page 1 of 1 |
| APPLICATION NO. | : 17/622741 | |
| DATED | : March 4, 2025 | |
| INVENTOR(S) | : Qing Bian | |

It is certified that error appears in the above-identified patent and that said Letters Patent is hereby corrected as shown below:

In the Specification

Column 9, Line 6, the parameter reading – $i14\_2_{rand}b''$ – should read -- $i14\_2_{rand}+b''$ --

Column 14, Line 8, the parameter reading – $i14\_2_{rand}b''$ – should read -- $i14\_2_{rand}+b''$ --

Column 14, Line 19, the parameter reading – $i14\_2_{rand}b'''$ – should read -- $i14\_2_{rand}+b'''$ --

Column 22, Lines 43-44, the parameter reading – $i14\_3_{rand}+C'$ – should read -- $i14\_3_{rand}+c'$ --

Column 22, Line 54, the parameter reading – $i14\_3_{rand}+C''$ – should read -- $i14\_3_{rand}+c''$ --

Column 22, Line 64, the parameter reading – $i14\_3_{rand}+C'''$ – should read -- $i14\_3_{rand}+c'''$ --

In the Claims

Column 26, Line 14, the parameter reading – $i1_{report}$ – should read -- $i12_{report}$ --

Signed and Sealed this
First Day of July, 2025

Coke Morgan Stewart
*Acting Director of the United States Patent and Trademark Office*